United States Patent
Ogawa et al.

(10) Patent No.: US 8,300,817 B2
(45) Date of Patent: Oct. 30, 2012

(54) INFORMATION PROCESSING APPARATUS, INFORMATION PROCESSING METHOD, AND COMPUTER PROGRAM

(75) Inventors: Akimichi Ogawa, Kanagawa (JP); Seiji Miyama, Tokyo (JP); Atsushi Onoe, Kanagawa (JP)

(73) Assignee: Sony Corporation, Tokyo (JP)

( * ) Notice: Subject to any disclaimer, the term of this patent is extended or adjusted under 35 U.S.C. 154(b) by 760 days.

(21) Appl. No.: 12/030,329

(22) Filed: Feb. 13, 2008

(65) Prior Publication Data

US 2008/0199010 A1    Aug. 21, 2008

(30) Foreign Application Priority Data

Feb. 15, 2007   (JP) ................ P2007-034366

(51) Int. Cl.
*H04L 29/06* (2006.01)
(52) U.S. Cl. ....................................... 380/200
(58) Field of Classification Search .......... 380/200, 380/201, 210, 216, 218; 382/216; 713/187, 713/178; 726/27
See application file for complete search history.

(56) References Cited

U.S. PATENT DOCUMENTS

| | | | |
|---|---|---|---|
| 2002/0126843 A1* | 9/2002 | Murase et al. | 380/201 |
| 2002/0143976 A1* | 10/2002 | Barker et al. | 709/231 |
| 2004/0025178 A1* | 2/2004 | Gordon et al. | 725/37 |
| 2004/0179523 A1 | 9/2004 | Maruyama et al. | |
| 2005/0190794 A1* | 9/2005 | Krause et al. | 370/485 |
| 2006/0206916 A1* | 9/2006 | Maeda et al. | 725/151 |

FOREIGN PATENT DOCUMENTS

| | | |
|---|---|---|
| JP | 2000-287192 | 10/2000 |
| JP | 2004-312412 | 11/2004 |
| JP | 2004-312413 | 11/2004 |
| WO | WO 01/84823 A2 | 11/2001 |
| WO | WO 02/073393 A1 | 9/2002 |

OTHER PUBLICATIONS

DTCP vol. 1 Supplement E Mapping DTCP to IP (Information Version), Hitachi, Ltd. et al.; Revision 1, Feb. 28, 2005.
Digital Transmission Content Protection Specification, vol. 1 (Information Version), Hitachi, Ltd. et al.; Revision 1.4, Feb. 28, 2005.
European Patent Office Action, EP 08 250 405.1 (Mar. 5, 2010).
Communication from the European Patent Office dated Sep. 3, 2009, in corresponding European Patent Application No. 08 250 105.1.
David McGrew et al., *The Secure Real Time Protocol*, Internet, Engineering Task Force, Audio/Video Transport Working Group, Internet Draft, <draft-mcgrew-avt-srtp-00.txt>, (Nov. 2000).

(Continued)

*Primary Examiner* — Ali Abyaneh
(74) *Attorney, Agent, or Firm* — Finnegan, Henderson, Farabow, Garrett & Dunner, L.L.P.

(57) ABSTRACT

An information processing apparatus for receiving broadcast data and outputting the received data to a client connected to a network includes a broadcast receiving unit that receives broadcast data; an encryption processor that performs encryption processing on the broadcast data received by the broadcast receiving unit; a data accumulation unit that accumulates encrypted data generated by the encryption processor; a data transmission unit that generates a communication packet in which encrypted data accumulated in the data accumulation unit is stored and outputs the generated communication packet; and a transmission data controller that monitors a retained state of the encrypted data in the data accumulation unit and removes, if a state different from a predetermined allowable retained state is detected, at least part of the encrypted data accumulated in the data accumulation unit from transmission data.

17 Claims, 18 Drawing Sheets

OTHER PUBLICATIONS

Hoffman, D. et al., "RTP Payload Format for MPEG1/MPEG2 Video," Oct. 2006, online: URL:http://www.ietf.org/rfc/rfc2038.txt, 7 pages.

European Search Report from European Patent Office dated Aug. 12, 2008, for Application No. 08250405.1-2223, 3 pages.

* cited by examiner

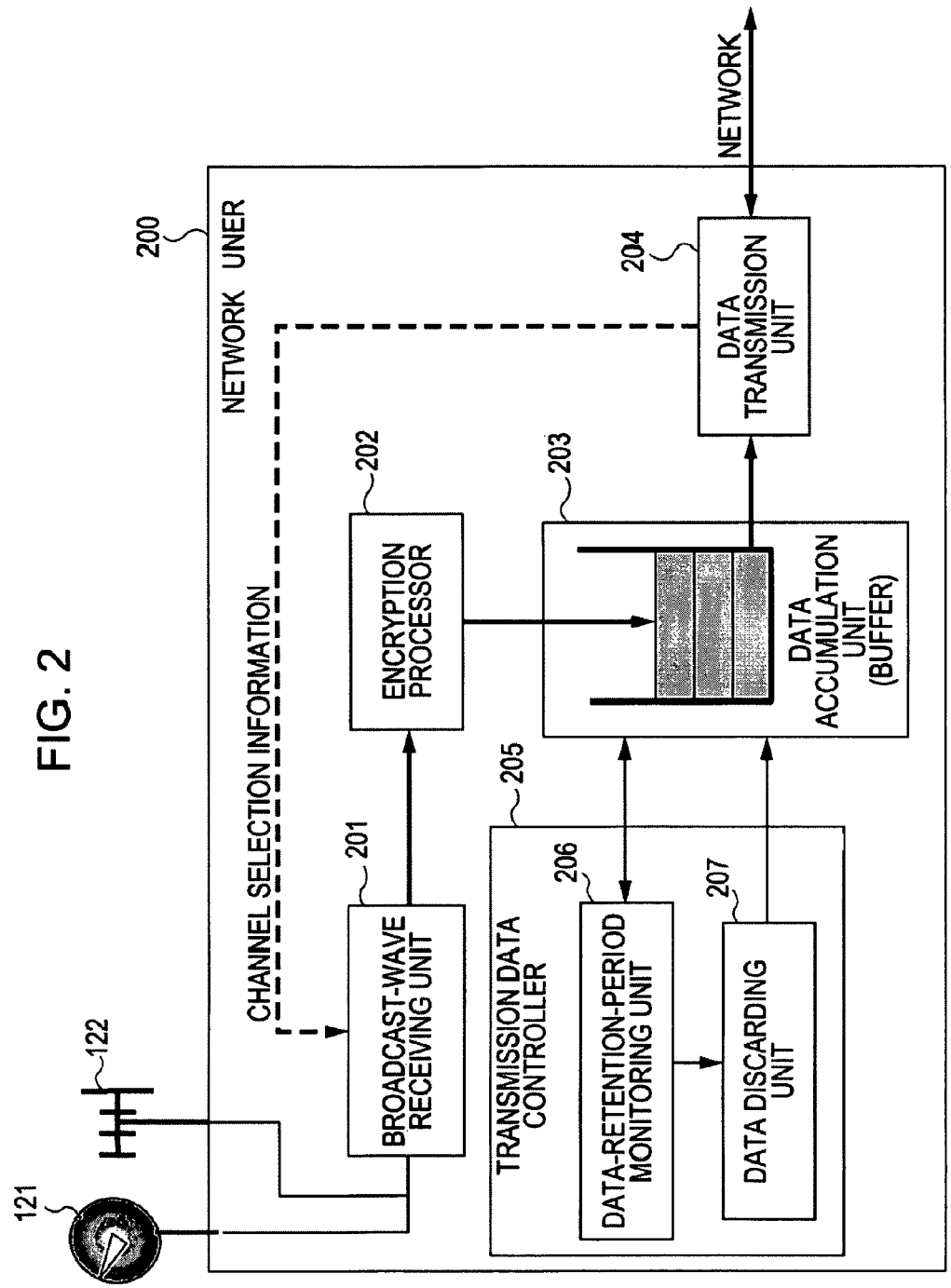

FIG. 3A
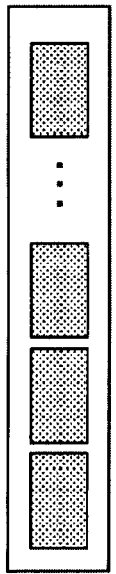
FIG. 3B1
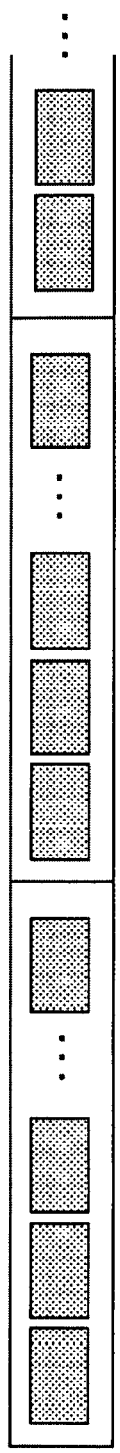
FIG. 3B2
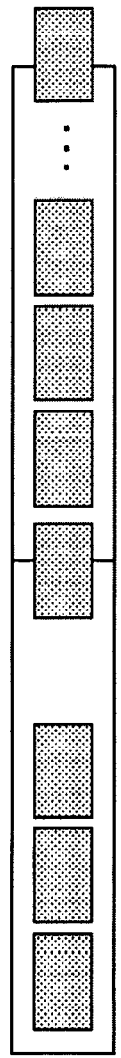
FIG. 3C

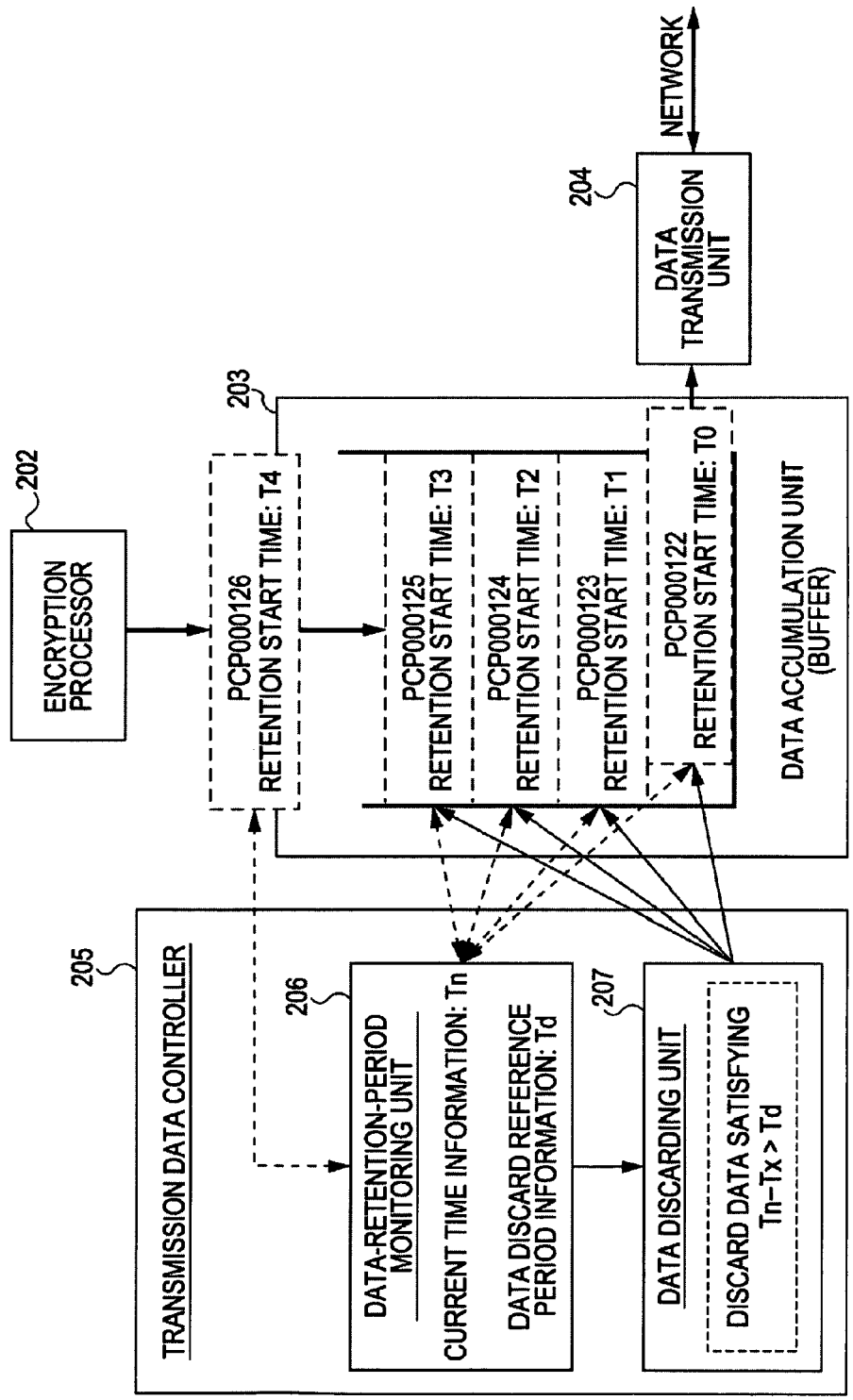

FIG. 5

| PCP-ID | PCP INPUT TIME [Tx] | RETENTION PERIOD [CURRENT TIME (Tn) − INPUT TIME (Tx)] |
|---|---|---|
| PCP000120 | 10:10:23.33 | 0:51 |
| PCP000121 | 10:10:23.52 | 0:42 |
| PCP000122 | 10:10:24.06 | 0:34 |
| PCP000123 | 10:10:24.12 | 0:28 |
| ... | ... | ... |

FIG. 6A  TIMESTAMPED TRANSPORT STREAM (TTS)

FIG. 6B  PROTECTED CONTENT PACKET (PCP)

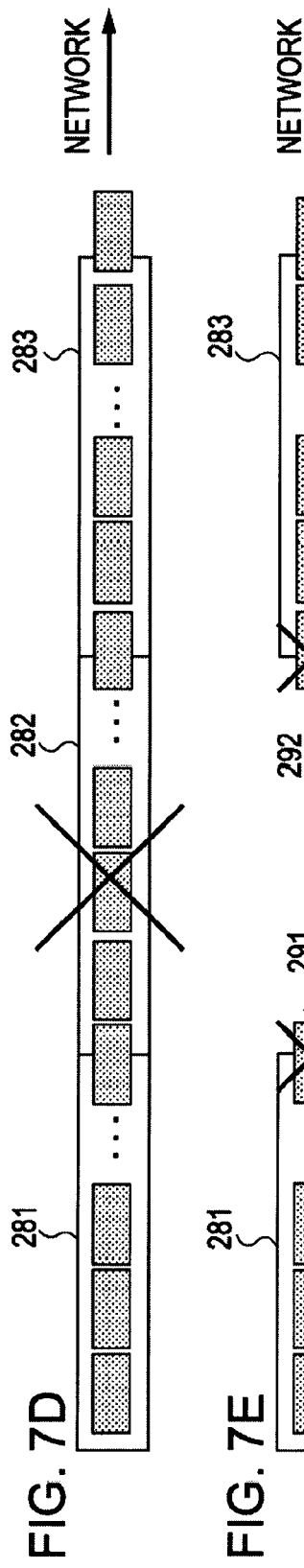

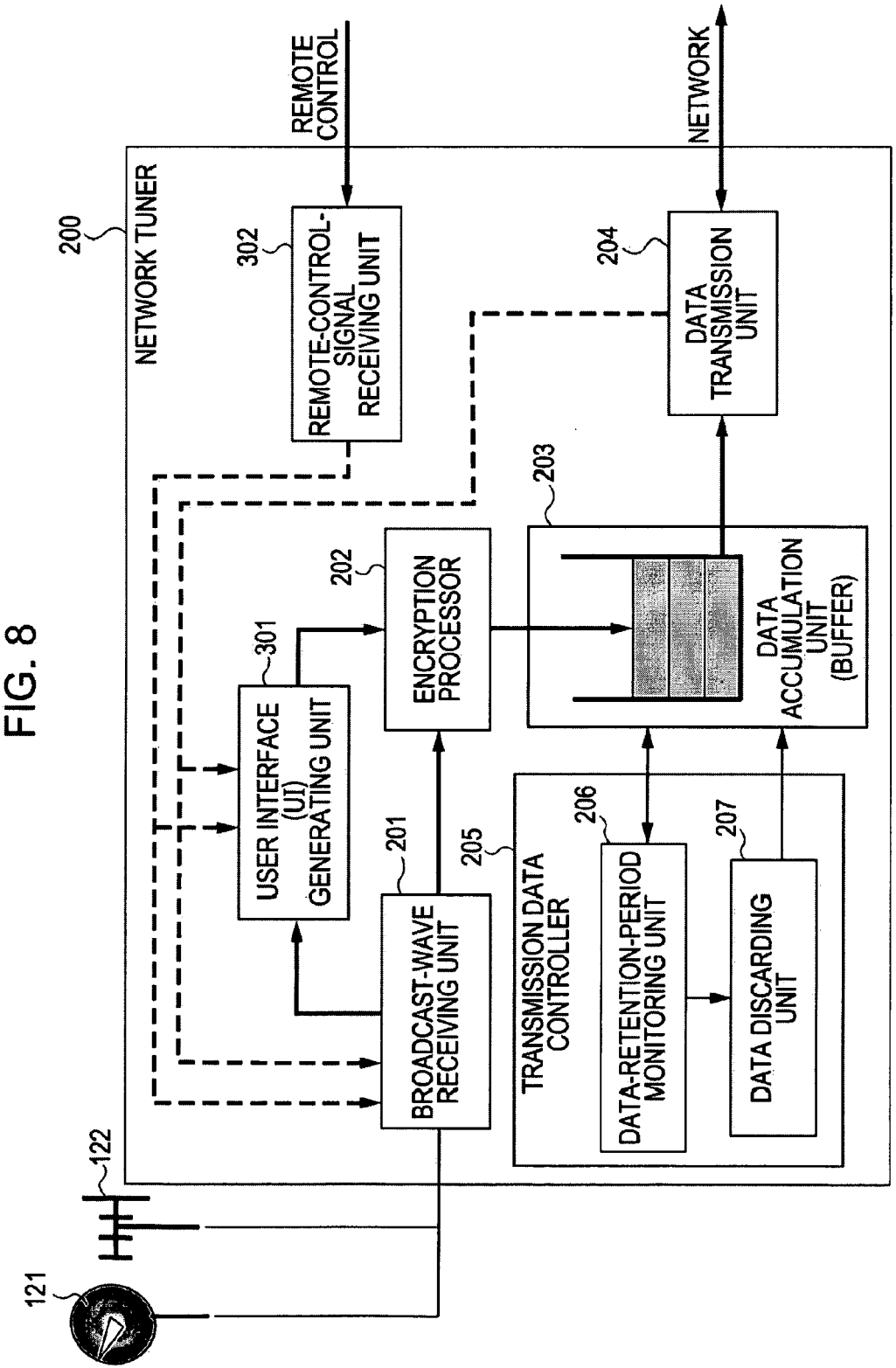

FIG. 15

| Container | Notify FLAG |
|---|---|
| CURRENT CHANNEL (CC) | 1 |
| TERRESTRIAL DIGITAL | 0 |
| BS DIGITAL | 0 |
| CS DIGITAL | 1 |

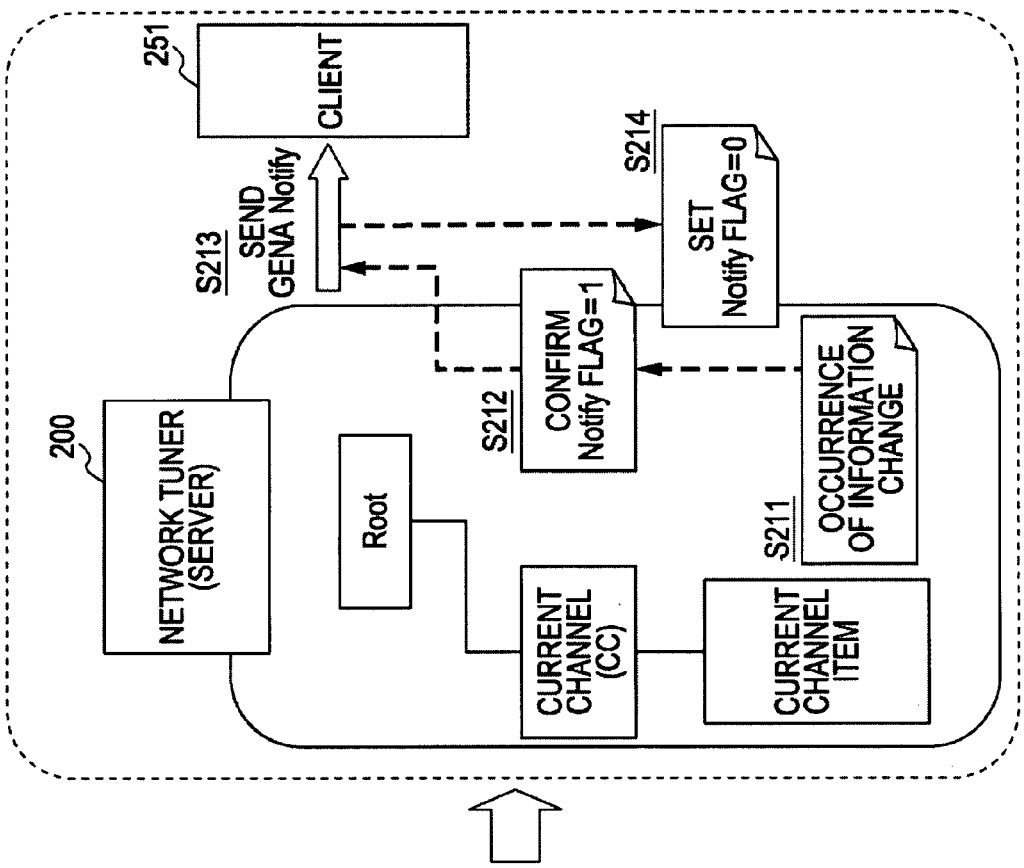
FIG. 16A2
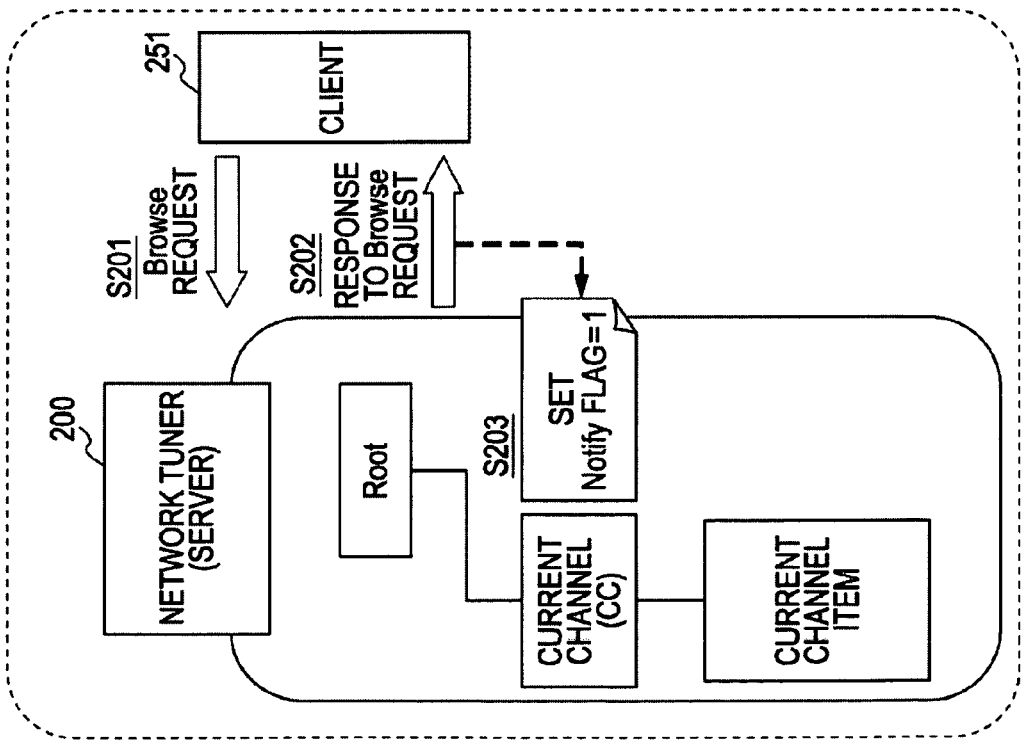
FIG. 16A1

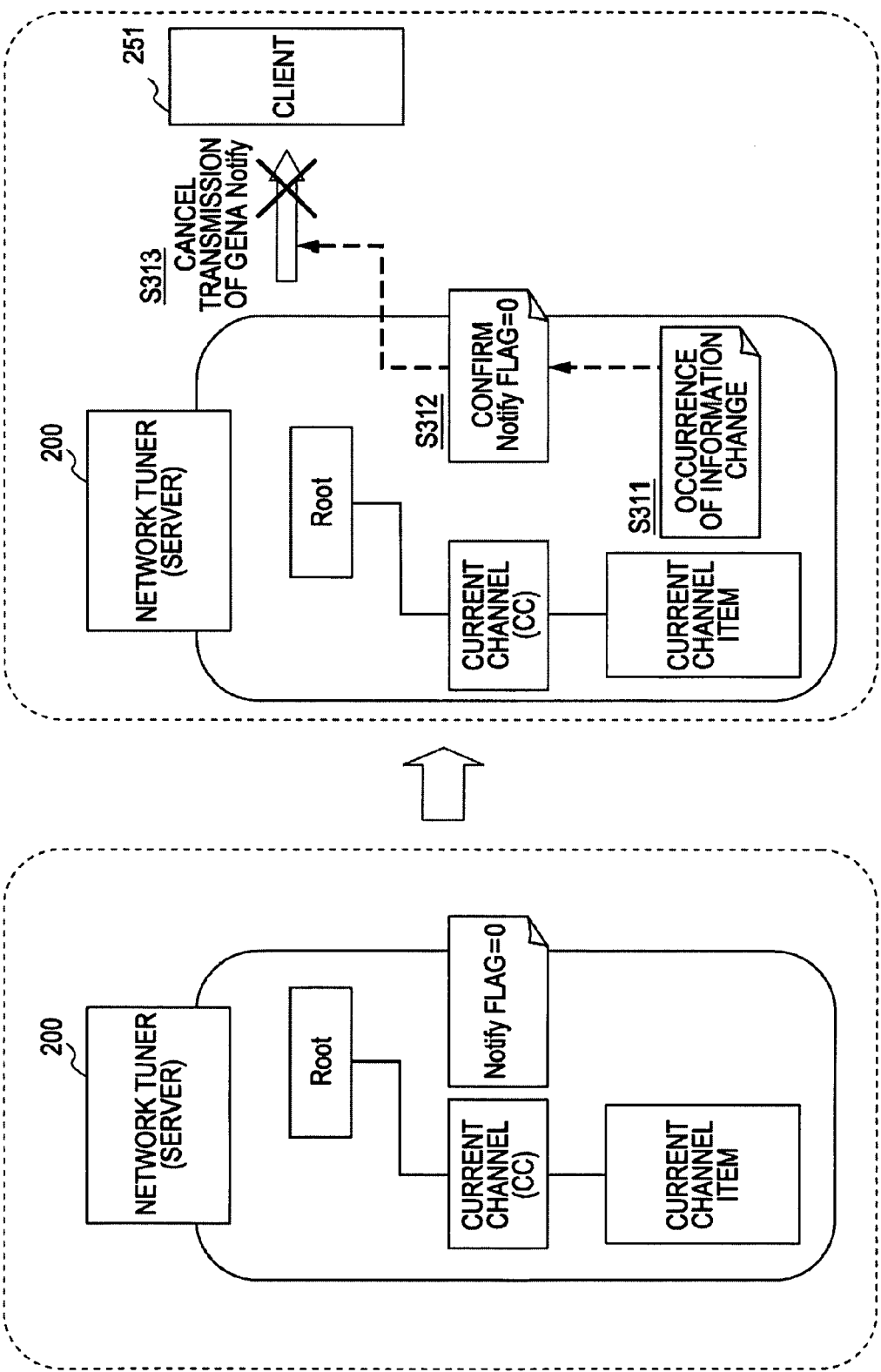

FIG. 18

| Container | CLIENT | Notify FLAG |
|---|---|---|
| CURRENT CHANNEL (CC) | CLIENT A | 1 |
| | CLIENT B | 0 |
| | CLIENT C | 0 |
| BS DIGITAL | CLIENT A | 1 |
| | CLIENT B | 1 |
| | CLIENT C | 0 |
| TERRESTRIAL DIGITAL | CLIENT A | 0 |
| | CLIENT B | 0 |
| | CLIENT C | 0 |
| ... | ... | ... |

INFORMATION PROCESSING APPARATUS, INFORMATION PROCESSING METHOD, AND COMPUTER PROGRAM

CROSS REFERENCES TO RELATED APPLICATIONS

The present invention contains subject matter related to Japanese Patent Application JP 2007-034366 filed in the Japanese Patent Office on Feb. 15, 2007, the entire contents of which are incorporated herein by reference.

BACKGROUND OF THE INVENTION

1. Field of the Invention

The present invention relates to information processing apparatuses, information processing methods, and computer programs. More specifically, the present invention relates to an information processing apparatus, an information processing method, and a computer program for executing processing for providing data received by a tuner to clients connected to a network.

2. Description of the Related Art

With the recent spread of data communication networks, a so-called home network is becoming increasingly used. A home network allows in-home network connection and communication between household electrical appliances, computers, and their peripherals. Through communication between such devices connected to the home network, data processing functions of the devices can be shared among them. A home network provides users with convenience and comfort by enabling transmission of content and the like between devices connected to the network, and is expected to be more and more widespread.

With such a home network, it is possible to deliver broadcast data received by a tuner to network-connected devices, such as personal computers (PCs) and displays, via the home network, and reproduce the broadcast data on a device located in a place different from the place where the tuner is located.

Today, a majority of audiovisual (AV) content, including broadcast content, is digitized and offered. Since digitized content is relatively vulnerable to unauthorized manipulations, such as unauthorized copying and tampering, it is necessary to take measures against unauthorized use of such content while allowing private or domestic use of the content. In response to this, various techniques have been developed for protecting copyright of digital content. For example, as an industry standard for protection of digitally transmitted content, there is a standard called Digital Transmission Content Protection (DTCP) developed by the Digital Transmission Licensing Administrator (DTLA). DTCP defines mechanisms for transmitting content in a copyright-protected form (see, e.g., Digital Transmission Content Protection Specification Volume 1 (Informational Version), Revision 1.4 (http://www.dtcp.com).

DTCP defines an authentication protocol for transmission of content between devices and a transmission protocol for transmission of encrypted content. In summary, DTCP specifies that a DTCP-compliant device should not send easily manageable compressed content (e.g., Moving Picture Experts Group (MPEG) content) outside the device in an unencrypted form; key exchange necessary for decryption of encrypted content should be performed according to a predetermined Authentication and Key Exchange (AKE) algorithm; and the range of devices between which key exchange is performed using AKE commands should be limited.

After an authentication procedure which involves sending and receiving of AKE commands, a server (DTCP Source or content provider) and a client (DTCP Sink or content receiver) share a key. A transmission line is encrypted with the key and thus, transmission of content is performed. Since every client needs to be successfully authenticated by the server to obtain an encryption key, an unauthorized client cannot receive the content. At the same time, by limiting the number and range of devices that can send and receive AKE commands, use of the content can be limited to what copyright laws call "private or domestic use".

DTCP originally defines transmission of digital content over a home network in which an Institute of Electrical and Electronics Engineers (IEEE) 1394 bus or the like is used as a transmission line. However, recently, as represented by the establishment of the Digital Living Network Alliance (DLNA), there has been a growing move toward in-home distribution of digital AV content via an Internet Protocol (IP) network. Accordingly, there is proposed DTCP technology applicable to IP networks, that is, the DTCP over IP (DTCP-IP) standard which realizes DTCP-compliant content distribution by using IP packets. Devices compliant with this DTCP-IP standard will be the next mainstream of home network devices.

Since most home networks are connected via routers to an external IP network, such as the Internet, it is often pointed out that content transmitted over such a network is at risk of unauthorized copying and tampering. Under such circumstances, the establishment of DTCP-IP technology allows flexible and efficient use of digital content over an IP network while protecting the content.

Basically, DTCP-IP is included in the DTCP standard and established by porting DTCP technology to an IP network. DTCP-IP specifies that an IP network is to be used as a transmission line. DTCP-IP also specifies a protocol to be used for transmission of encrypted content. Since various devices, such as PCs, are connected to the IP network, there are high risks of interception and tampering of data. Therefore, DTCP-IP provides detailed specifications for transmitting content over the network while protecting the content (see, e.g., DTCP Volume 1 Supplement E Mapping DTCP to IP (Informational Version), Revision 1.1 (http://www.dtcp.com)).

Content transmission compliant with DTCP-IP will now be described. Here, content transmission based on the Hyper-Text Transfer Protocol (HTTP) is performed between a DTCP_Source device and a DTCP_Sink device, which are both DTCP-IP compliant. For example, the DTCP_Source device is a server which provides content, while the DTCP_Sink device is a client which receives the content from the server. The DTCP_Source device and the DTCP_Sink device perform encryption communication therebetween while changing a content key in the middle of transmission of a long byte stream, such as a transmission control protocol (TCP) stream. Additionally, confirmation of the content key is made before decryption of encrypted content and implementation of other kinds of content processing. At every step of the procedure which involves AKE, content transmission, and content key confirmation, a TCP connection is established between the DTCP_Source device and the DTCP_Sink device.

More specifically, if the AKE procedure is successful, the DTCP_Source device and the DTCP_Sink device can share an authentication key $K_{auth}$. The DTCP_Source device and the DTCP_Sink device individually perform similar internal processing to generate a seed key $K_x$, which is a seed of a content key, from the authentication key $K_{auth}$. The DTCP_

Source device generates a nonce $N_c$ using random numbers, further generates a content key $K_c$ on the basis of the seed key $K_x$ and the nonce $N_c$, encrypts content requested by the DTCP_Sink device with the content key $K_c$, and sends a packet including the encrypted content and the nonce $N_c$ to the DTCP_Sink device over a TCP stream. The DTCP_Sink device extracts the nonce $N_c$ from the received TCP stream, calculates the content key $K_c$ using the extracted nonce $N_c$ and the seed key $K_x$ determined from the authentication key $K_{auth}$, and thus can decrypt the encrypted content.

As described above, DTCP-IP provides a content transmission method in which authentication is performed between DTCP-compliant devices, a key is shared between the DTCP-compliant devices upon completion of the DTCP authentication, content to be transmitted is encrypted, and the encrypted and transmitted content is decrypted. Thus, this content transmission method can prevent the content from being intercepted or tampered in the middle of the transmission line, and can ensure security of the content even over an IP network.

For example, when content is requested according to an HTTP procedure, a DTCP_Source device serves as an HTTP server and a DTCP_Sink device serves as an HTTP client. The HTTP client creates a TCP/IP connection for HTTP and thus, transmission of the content is started. The HTTP client requests the content from the HTTP server according to an operation procedure similar to a typical HTTP procedure. The HTTP server returns the requested content as a response to the HTTP client. Specifically, the HTTP server encrypts the content requested by the HTTP client with a content key $K_c$ and sends a packet (Protected Content Packet (PCP), see, e.g., Japanese Unexamined Patent Application Publication No. 2000-287192) including a payload constituted by the encrypted content and a header containing a nonce $N_c$ over a TCP stream.

For example, in a home network to which clients and a network tuner capable of receiving broadcast content and providing the clients with the received content are connected, the network tuner that delivers broadcast data needs to respond to an operation request from a client as quickly as possible. However, using TCP as a communication protocol may cause a significant delay in response, although reliable delivery of data to a client can be ensured.

That is, to ensure integrity of communication data in data transmission based on TCP, if there is data that cannot be received by a client, the client requests retransmission of the data from the server, which then retransmits the data in response to the request.

Specifically, assume that a five-second communication failure occurs when data delivered by the network tuner is being reproduced by the client. In processing performed according to TCP, when the communication is restored, data transmission is resumed from a picture present immediately before the occurrence of the failure (i.e., picture of five seconds ago). This means that the client starts reproduction at a picture of five seconds ago. From then on, data transmission continues with a five-second delay maintained.

When such data transmission takes place, even if a user on the client side sends a channel change request to the network tuner, the user will not be able to view a picture on the changed channel until a lapse of at least five seconds, since a delay of five seconds is maintained. This will be seen by the user as degradation in the speed of response to operations and will cause a processing delay in response to user requests.

SUMMARY OF THE INVENTION

The present invention has been made in view of the circumstances described above. It is desirable to provide an information processing apparatus, an information processing method, and a computer program that can realize processing for providing clients connected to a network with content without significant delay.

According to an embodiment of the present invention, an information processing apparatus for receiving broadcast data and outputting the received data to a client connected to a network includes a broadcast receiving unit that receives broadcast data; an encryption processor that performs encryption processing on the broadcast data received by the broadcast receiving unit; a data accumulation unit that accumulates encrypted data generated by the encryption processor; a data transmission unit that generates a communication packet in which encrypted data accumulated in the data accumulation unit is stored and outputs the generated communication packet; and a transmission data controller that monitors a retained state of the encrypted data in the data accumulation unit and removes, if a state different from a predetermined allowable retained state is detected, at least part of the encrypted data accumulated in the data accumulation unit from transmission data.

In the information processing apparatus according to another embodiment of the present invention, the transmission data controller is configured to monitor a retention period of the encrypted data in the data accumulation unit and remove, from transmission data, encrypted data retained in the data accumulation unit for a period of time exceeding a predetermined allowable retention period.

In the information processing apparatus according to another embodiment of the present invention, the encrypted data generated by the encryption processor is a protected content packet that includes a plurality of timestamped transport stream packets, each being formed by adding a timestamp to a transport stream packet, and has a size that is an integral multiple of the size of each of the timestamped transport stream packets; and the transmission data controller is configured to monitor a retention period of each of protected content packets accumulated in the data accumulation unit and remove, from transmission data, a protected content packet retained in the data accumulation unit for a period of time exceeding a predetermined allowable retention period.

In the information processing apparatus according to another embodiment of the present invention, the data transmission unit is configured to generate, as transmission data, a transmission control protocol packet from at least one of the protected content packets accumulated in the data accumulation unit, the at least one protected content packet being retained in the data accumulation unit for a period of time less than or equal to a predetermined allowable retention period, and output the generated transmission control protocol packet to the network.

In the information processing apparatus according to another embodiment of the present invention, the transmission data controller is configured to monitor the amount of the encrypted data retained in the data accumulation unit and remove, if the amount of the encrypted data retained in the data accumulation unit exceeds a predetermined allowable value, at least part of the encrypted data accumulated in the data accumulation unit from transmission data.

The information processing apparatus according to another embodiment of the present invention further includes a user interface generating unit that generates user interface information to be provided to the client, wherein the interface generating unit is configured to generate user interface information in response to a request from the client and output the generated user interface information to the encryption processor; and the data transmission unit is configured to generate and output a transmission control protocol packet including the user interface information and output the generated transmission control protocol packet to the client.

In the information processing apparatus according to another embodiment of the present invention, the user interface generating unit is configured to generate the user interface information on the basis of an input from a remote control or from an operation unit.

The information processing apparatus according to another embodiment of the present invention further includes a program-information management unit that inputs, via the broadcast receiving unit, program information corresponding to a broadcast program input via the broadcast receiving unit and manages the input program information; and a program-information-update monitoring unit that monitors whether program information managed by the program-information management unit has been updated. The program-information management unit has a flag indicating whether a client connected to the network has performed browse processing on program information. When detection information indicating that an update of program information has been detected is received from the program-information-update monitoring unit, if the flag is set to a value indicating that browse processing has been performed, the program-information management unit sends, to the client, an information update notification indicating that the program information has been updated.

In the information processing apparatus according to another embodiment of the present invention, the program-information management unit is configured to have a flag for each Container serving as a higher-level object than an item corresponding to each program information, the flag indicating whether a client connected to the network has performed browse processing on program information, and control the information update notification with respect to each Container.

In the information processing apparatus according to another embodiment of the present invention, the program-information management unit is configured to have a flag for each client, the flag indicating whether a client connected to the network has performed browse processing on program information, and control the information update notification with respect to each client.

According to an embodiment of the present invention, an information processing method executed in an information processing apparatus for receiving broadcast data and outputting the received data to a client connected to a network includes the steps of receiving broadcast, wherein a broadcast receiving unit receives broadcast data; performing encryption processing, wherein an encryption processor performs encryption processing on the broadcast data received by the broadcast receiving unit; accumulating data, wherein a data accumulation unit accumulates encrypted data generated by the encryption processor; transmitting data, wherein a data transmission unit generates a communication packet in which encrypted data accumulated in the data accumulation unit is stored and outputs the generated communication packet; and controlling transmission data, wherein a transmission data controller monitors a retained state of the encrypted data in the data accumulation unit and removes, if a state different from a predetermined allowable retained state is detected, at least part of the encrypted data accumulated in the data accumulation unit from transmission data.

In the information processing method according to another embodiment of the present invention, in the step of controlling transmission data, a retention period of the encrypted data in the data accumulation unit is monitored and encrypted data retained in the data accumulation unit for a period of time exceeding a predetermined allowable retention period is removed from transmission data.

In the information processing method according to another embodiment of the present invention, the encrypted data generated in the step of performing encryption processing is a protected content packet that includes a plurality of timestamped transport stream packets, each being formed by adding a timestamp to a transport stream packet, and has a size that is an integral multiple of the size of each of the timestamped transport stream packets; and in the step of controlling transmission data, a retention period of each of protected content packets accumulated in the data accumulation unit is monitored and a protected content packet retained in the data accumulation unit for a period of time exceeding a predetermined allowable retention period is removed from transmission data.

In the information processing method according to another embodiment of the present invention, in the step of transmitting data, a transmission control protocol packet is generated, as transmission data, from at least one of the protected content packets accumulated in the data accumulation unit, the at least one protected content packet being retained in the data accumulation unit for a period of time less than or equal to a predetermined allowable retention period, and the generated transmission control protocol packet is output to the network.

In the information processing method according to another embodiment of the present invention, in the step of controlling transmission data, the amount of the encrypted data retained in the data accumulation unit is monitored and if the amount of the encrypted data retained in the data accumulation unit exceeds a predetermined allowable value, at least part of the encrypted data accumulated in the data accumulation unit is removed from transmission data.

The information processing method according to another embodiment of the present invention further includes the step of generating a user interface, wherein a user interface generating unit generates user interface information to be provided to the client; in the step of generating a user interface, user interface information is generated in response to a request from the client and the generated user interface information is output to the encryption processor; and in the step of transmitting data, a transmission control protocol packet including the user interface information is generated and output to the client.

In the information processing method according to another embodiment of the present invention, in the step of generating a user interface, the user interface information is generated on the basis of an input from a remote control or from an operation unit.

The information processing method according to another embodiment of the present invention further includes the steps of managing program information, wherein a program-information management unit inputs, via the broadcast receiving unit, program information corresponding to a broadcast program input via the broadcast receiving unit and manages the input program information; monitoring a program information update, wherein a program-information-update monitoring unit monitors whether program information managed by the program-information management unit has been updated; and controlling an information update notification, wherein the program-information management unit sets a flag indicating whether a client connected to the network has performed browse processing on program information, and when detection information indicating that an update of program information has been detected is received from the program-information-update monitoring unit, if the flag is set to a value indicating that browse processing has been performed, an information update notification indicating that the program information has been updated is sent to the client.

In the information processing method according to another embodiment of the present invention, in the step of controlling an information update notification, a flag indicating whether a client connected to the network has performed browse processing on program information is set for each Container which serves as a higher-level object than an item corresponding to each program information, and the information update notification is controlled with respect to each Container.

In the information processing method according to another embodiment of the present invention, in the step of controlling an information update notification, a flag indicating whether a client connected to the network has performed browse processing on program information is set for each client, and the information update notification is controlled with respect to each client.

According to an embodiment of the present invention, a computer program causes information processing to be executed in an information processing apparatus for receiving broadcast data and outputting the received data to a client connected to a network. The information processing includes the steps of receiving broadcast, wherein a broadcast receiving unit receives broadcast data; performing encryption processing, wherein an encryption processor performs encryption processing on the broadcast data received by the broadcast receiving unit; accumulating data, wherein a data accumulation unit accumulates encrypted data generated by the encryption processor; transmitting data, wherein a data transmission unit generates a communication packet in which encrypted data accumulated in the data accumulation unit is stored and outputs the generated communication packet; and controlling transmission data, wherein a transmission data controller monitors a retained state of the encrypted data in the data accumulation unit and removes, if a state different from a predetermined allowable retained state is detected, at least part of the encrypted data accumulated in the data accumulation unit from transmission data.

The computer program according to an embodiment of the present invention is a computer program that can be provided to a computer system capable of executing various types of program code via a storage medium, such as a compact disc (CD), a floppy disk (FD), or a magneto-optical (MO) disk, for storing the program in a computer-readable form, or via a communication medium, such as a network. By providing such a computer program to a computer system in a computer-readable form, the computer system can carry out processing according to the program.

Further features and advantages of the present invention will become apparent from more detailed descriptions based on the following embodiments of the present invention and attached drawings. In the present specification, the term "system" refers to a logical set of a plurality of apparatuses, and is not limited to an apparatus which includes elements in the same housing.

According to an embodiment of the present invention, an information processing apparatus (or network tuner) capable of providing clients connected to a network with broadcast content is configured to monitor a buffer in which transmission data containing broadcast data is accumulated, monitor the retained state of data in the buffer (e.g., data retention period), and remove data retained in the buffer for a period of time exceeding a predetermined allowable retention period from the transmission data. This configuration can solve the problem in that a data transmission delay caused by a retransmission request from a client or the like is maintained and accumulated. Therefore, it is possible to realize real-time transmission of broadcast content and provide a quicker response to a processing request, such as a channel change request, from a client.

BRIEF DESCRIPTION OF THE DRAWINGS

FIG. 2 illustrates an exemplary configuration of a network tuner according to a first embodiment of the present invention.

FIGS. 3A through 3C illustrate an exemplary configuration of PCPs generated by an encryption processor in the network tuner.

FIG. 4 illustrates an example of transmission-data discard processing executed by the network tuner.

FIG. 5 is a table showing exemplary processing performed by a data-retention-period monitoring unit to calculate the retention period of each PCP in a data accumulation unit (buffer).

FIGS. 6A through 6E illustrate the data sizes of PCPs and data discard processing performed on a PCP-by-PCP basis.

FIGS. 7A through 7E illustrate the data sizes of PCPs and data discard processing performed on a PCP-by-PCP basis.

FIG. 8 illustrates an exemplary configuration of a network tuner which performs processing to provide a user interface (UI).

FIG. 15 illustrates an exemplary configuration of a flag management table stored in a program-information management unit of the network tuner.

FIG. 16A1 and FIG. 16A2 illustrate processing performed by the network tuner when a Notify flag is "1".

FIG. 17B1 and FIG. 17B2 illustrate processing performed by the network tuner when a Notify flag is "0".

FIG. 18 illustrates an exemplary configuration of a flag management table stored in the program-information management unit of the network tuner.

DESCRIPTION OF THE PREFERRED EMBODIMENTS

An information processing apparatus, an information processing method, and a computer program according to embodiments of the present invention will now be described in detail with reference to the drawings. The description will be made under the headings listed below:

1. Example of network configuration
2. Configuration for preventing data delay by discarding transmission data 3. Configuration for providing client with user interface (UI)

4. Configuration for providing client with program information

1. Example of Network Configuration

First, with reference to FIG. 1, there will be described a network environment to which an information processing apparatus according to an embodiment of the present invention is applicable. The information processing apparatus executes processing for providing clients connected to the network with data received by an internal tuner. The information processing apparatus corresponds to a network tuner 200 of FIG. 1.

Figure 1:
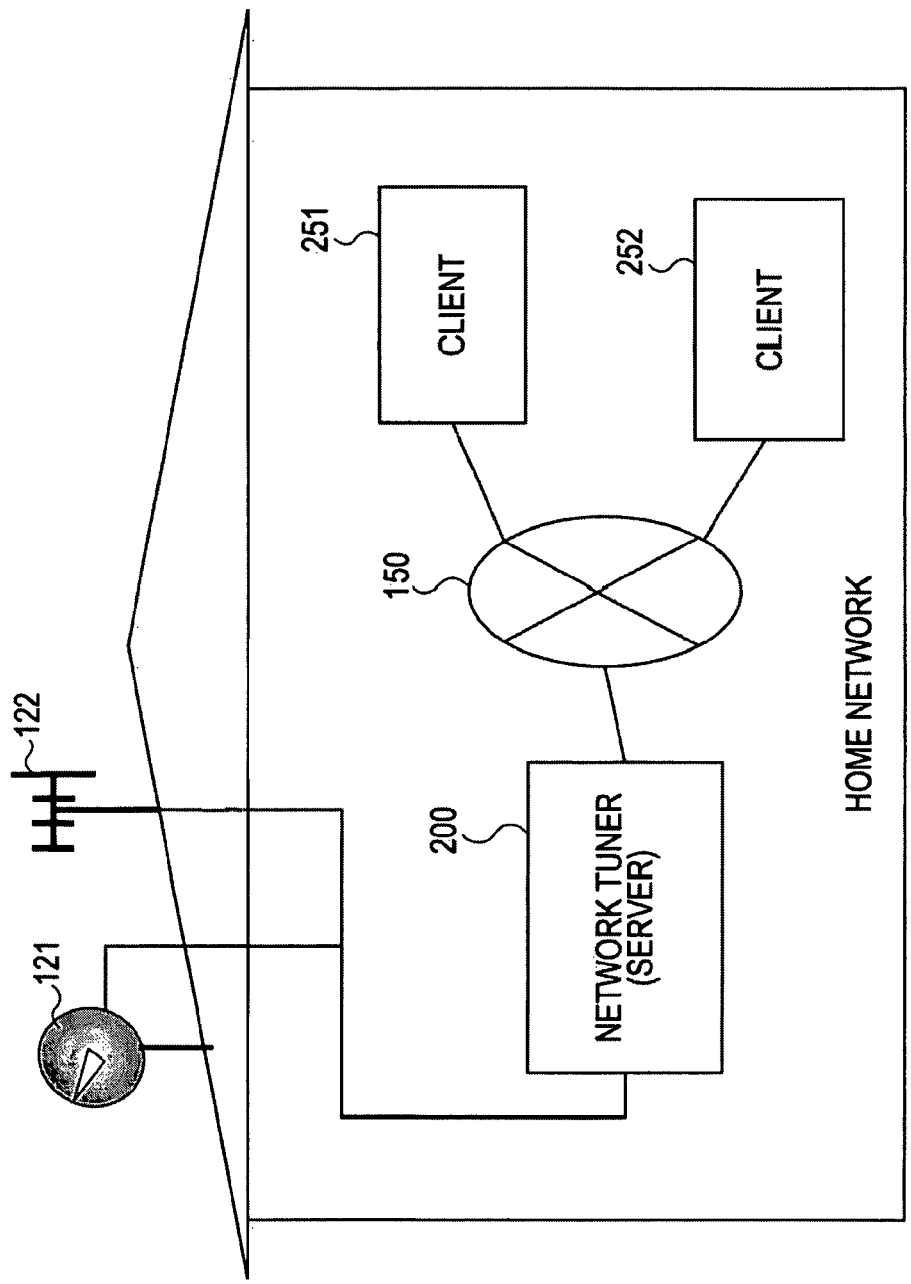
FIG. 1 illustrates a network environment to which an information processing apparatus according to an embodiment of the present invention is applicable.

FIG. 1 illustrates a configuration of a home network to which various information processing devices are connected. The network tuner 200 includes a television (TV) tuner, receives terrestrial and satellite broadcasts via antennas 121 and 122, and provides received content via a network 150 to clients 251 and 252.

For example, the network 150 illustrated in FIG. 1 is an IP network. Transmission of digital content via the network 150 is executed according to the DTCP-IP standard. As described above, for transmission of digital content according to DTCP-IP, authentication is performed between a server (DTCP Source or content provider) and a client (DTCP Sink or content receiver). Then, the server encrypts and sends the content to the client, which receives and decrypts the encrypted content and reproduces the decrypted content. In this series of processing, which involves AKE, content transmission, and content key confirmation, a TCP connection between the server and the client is established at every step of the processing.

Content is encrypted with a content key and sent over a TCP stream as a packet (PCP), which includes a payload constituted by the encrypted content and a header containing content key generation information (nonce N).

In the example of FIG. 1, after receiving broadcast content via the antennas 121 and 122, the network tuner 200 performs encryption and PCP generation processing on the received content, and then outputs this content to the clients 251 and 252.

2. Configuration for Preventing Data Delay by Discarding Transmission Data

As described above, to ensure integrity of communication data in data transmission based on TCP, if there is data that cannot be received by a client, the client requests retransmission of the data from the server, which then retransmits the data in response to the request. Therefore, this increases the possibility of occurrence of a delay in data delivery.

As described above, in communication carried out according to TCP, when data transmission is to be resumed after restoration of server-client communication, the data transmission starts again from a picture present immediately before the occurrence of failure (e.g., picture of five seconds ago). This means that the subsequent server-client data transmission will be performed with the resulting delay time (e.g., five seconds) maintained.

Thus, during the continuous transmission of content, a delay that has once occurred is maintained or will gradually be increased by repeated retransmission. As a result of such data transmission, for example, even if a user on the client side sends a channel change request to the network tuner, the channel will not be changed until a lapse of predetermined delay time (e.g., five seconds) due to the delay.

The information processing apparatus according to an embodiment of the present invention or the network tuner 200 of FIG. 1 is configured to execute processing for eliminating such delay, realize substantially real-time delivery of broadcast content, and provide a quicker response to user operation, channel change request, remote control operation, and the like.

To prevent an excessive increase in the amount of delay, the information processing apparatus according to an embodiment of the present invention or the network tuner 200 of FIG. 1 performs processing for removing old data from data to be transmitted. That is, the network tuner 200 discards old data. However, if data is randomly discarded without any consideration, the clients 251 and 252 may not be able to perform reproduction properly. In particular, for network distribution of digital broadcast content, data needs to be encrypted before being transmitted over the network. If data is randomly discarded, decryption may not be able to be properly performed on the client side. Therefore, with consideration given to predetermined conditions for discarding of data, the network tuner 200 selects data to be discarded and discards the selected data.

FIG. 2 illustrates an exemplary configuration of an information processing apparatus or a network tuner 200 according to a first embodiment of the present invention. As illustrated in FIG. 2, the network tuner 200 includes a broadcast-wave receiving unit 201, an encryption processor 202, a data accumulation unit (buffer) 203, a data transmission unit 204, and a transmission data controller 205. The transmission data controller 205 includes a data-retention-period monitoring unit 206 and a data discarding unit 207.

The broadcast-wave receiving unit 201 receives broadcast data via the antennas 121 and 122, extracts broadcast content (MPEG data) corresponding to a selected channel, and outputs the extracted broadcast content to the encryption processor 202. Information about the selected channel can be input via the data transmission unit 204 from a client, or can be input via a remote control or an operation unit (both are not shown).

The encryption processor 202 encrypts the broadcast content extracted by the broadcast-wave receiving unit 201 in DTCP-IP format and outputs the encrypted content to the data accumulation unit 203.

The encryption processor 202 executes encryption with a content key, which serves as a key for encryption of content. Then, the encryption processor 202 generates a packet (PCP) which includes a payload constituted by the encrypted content and a header containing content key generation information. A content key is a key determined for AKE processing executed as preprocessing for content transmission between a server (i.e., the network tuner 200 in this example) and a client (i.e., a content receiver, such as the client 251 or client 252 of FIG. 1).

A configuration of PCPs generated by the encryption processor 202 in the network tuner 200 according to an embodiment of the present invention will be described with reference to FIGS. 3A, 3B1, 3B2, and 3C. FIG. 3A illustrates a plurality of timestamped transport stream (TTS) packets, each having a total size of 192 bytes and formed by adding a 4-byte timestamp to a 188-byte transport stream (TS) packet. FIGS. 3B1 and 3B2 illustrate PCPs, which are encrypted packets. Each PCP serves as a unit of transmission and is generated from a plurality of TTS packets.

The encryption processor 202 inputs broadcast content received by the broadcast-wave receiving unit 201; forms MPEG2-TTS packets of FIG. 3A, each MPEG2-TTS packet (192 bytes) having a timestamp; generates, from a plurality of MPEG2-TTS packets, a PCP of FIG. 3B1 as a unit of encryption; and outputs the PCP to the data accumulation unit 203 of FIG. 2.

The PCP of FIG. 3B1 serves both as a unit of encryption executed by the encryption processor 202 and as a unit of data transmission. As illustrated in FIG. 3B2, the transmission is executed on a PCP-by-PCP basis. Basically, the amount of PCP data (or the number of bytes of PCP data) can be set to any value on the server side. In the network tuner 200 of an embodiment of the present invention, the data size of a single PCP is set to 192×n bytes, which is an integral multiple of the number of bytes of a TTS packet (192 bytes).

For data transmission, a server can set the number of bytes of PCP data to any value. As illustrated in FIG. 3C, in typical PCP generation processing of a related art, PCPs in which data is divided in the middle of a single TTS packet are generated and transmitted on a PCP-by-PCP basis. Even if PCPs are generated and transmitted in this manner, TS-packet-based processing is still possible and there is no problem in data decryption and reproduction, as long as TCP-based data communication is performed and all data is received and decrypted on the client side.

However, the network tuner 200 of an embodiment of the present invention is configured to discard transmission data according to a delay in data transmission. For this discard processing, the data size of a single PCP to be transmitted is set to an integral multiple of the number of bytes of a TTS packet (192 bytes), that is, 192×n bytes. With this PCP size setting, it is possible to reduce negative effects of PCP-based discard processing on content decryption and reproduction, which are performed on the client side.

An example of transmission-data discard processing performed by the network tuner 200 according to an embodiment of the present invention will be described with reference to FIG. 4 and subsequent drawings. As illustrated in FIG. 4, data generated by the encryption processor 202 is accumulated in the data accumulation unit 203 on a PCP-by-PCP basis.

The data-retention-period monitoring unit 206 in the transmission data controller 205 monitors a retention period for which data is retained in the data accumulation unit 203 on a PCP-by-PCP basis. The data discarding unit 207 in the transmission data controller 205 extracts a PCP retained in the data accumulation unit 203 for a period of time exceeding a predetermined data discard reference period Td and discards the extracted PCP. Thus, data discard processing is performed on a PCP-by-PCP basis.

Processing performed by the transmission data controller 205 will now be described in detail.

The data-retention-period monitoring unit 206 associates, with each PCP, an input time at which the PCP was input from the encryption processor 202 to the data accumulation unit 203. Then, the data-retention-period monitoring unit 206 records the input time associated with each input PCP and calculates the retention period of each input PCP in the data accumulation unit 203. For example, as shown in FIG. 5, an input time Tx serving as a storage start time of each PCP in the data accumulation unit 203 is associated with an ID (PCP-ID) of the input PCP and recorded. Then, the retention period of each PCP in the data accumulation unit 203 is determined by subtracting the input time Tx from the current time Tn, that is, by calculating Tn−Tx.

The data discarding unit 207 compares the retention period Tn−Tx of each PCP in the data accumulation unit 203 with the data discard reference period Td serving as a predetermined allowable retention period. If the data discarding unit 207 detects that there is, in the data accumulation unit 203, a PCP with a retention period Tn−Tx exceeding the data discard reference period Td, in other words, if the data discarding unit 207 detects the presence of a PCP that satisfies $$Tn-Tx>Td$$

in the data accumulation unit 203, the data discarding unit 207 executes processing for discarding the PCP.

As a result, only data retained in the data accumulation unit 203 for a period of time less than or equal to the data discard reference period Td is selected and output to the data transmission unit 204. The data transmission unit 204 recognizes only data input from the data accumulation unit 203 as data to be transmitted and executes transmission of the data according to TCP. Conversely, data that is not input in the data transmission unit 204 is not recognized by the data transmission unit 204 as data to be transmitted.

The data transmission unit 204 executes processing in a transport layer (TCP layer) and the subsequent layers of a so-called International Organization for Standardization (ISO) reference model. More specifically, when the ISO reference model includes, in order from the upper layer, application layer,
transport layer (TCP layer),
Internet layer (IP layer), and
physical layer, the data transmission unit 204 executes processing in the transport layer, Internet layer, and physical layer. The data transmission unit 204 generates a TCP packet and an IP packet on the basis of PCPs input from the data accumulation unit 203 and executes data transmission via a network interface.

Data (PCP) retained in the data accumulation unit 203 for a period of time exceeding the data discard reference period Td is discarded before generation of a TCP packet, and thus is not selected as data to be transmitted according to TCP. In other words, since data discarded in the transmission data controller 205 does not even exist at the time of TCP packet generation, the data transmission unit 204 generates a TCP packet for data retained in the data accumulation unit 203 for a period of time less than or equal to the data discard reference period Td. A client requests retransmission of unreceived data on the basis of an analysis of a TCP packet. In this analysis performed in the client, data discarded in the transmission data controller 205 is recognized as data that does not originally exist. Therefore, retransmission request for discarded data is not executed. As a result, the client receives data retained in the data accumulation unit 203 for a period of time less than or equal to the data discard reference period Td, and performs decryption and reproduction of the received data.

As described above, the data size of a PCP generated by the encryption processor 202 is set to an integral multiple of that of an MPEG2-TTS packet (192 bytes). The transmission data controller 205 executes data discard processing on a PCP-by-PCP basis. Since the data size of a PCP is thus set to an integral multiple of that of a TTS packet and data is discarded on a PCP-by-PCP basis, even when PCP data discarding based on the data retention period is performed, the client can receive PCPs each containing complete MPEG2-TTS packets only. This means that negative effects of data loss on decryption and reproduction processing can be reduced.

The reasons for this will be described with reference to FIGS. 6A through 6E and FIGS. 7A through 7E.

Figures 6C, 6D, 6E:
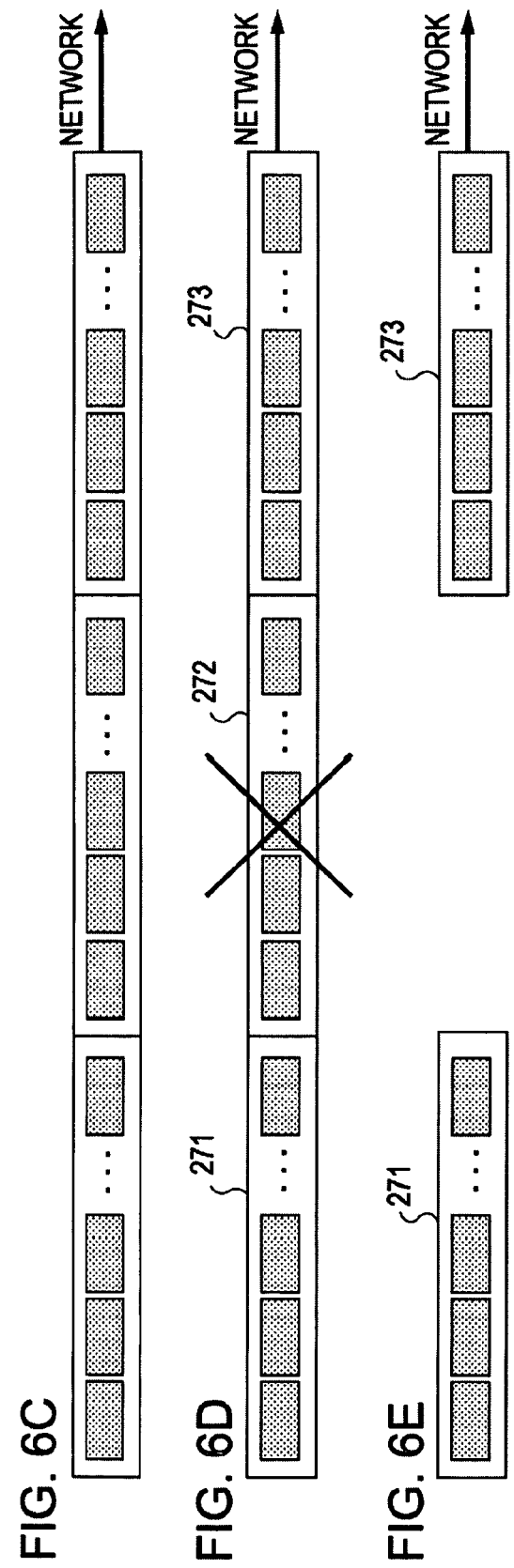

Similar to FIGS. 3A through 3C, FIGS. 6A through 6E illustrate processing performed by the information processing apparatus or network tuner 200 according to an embodiment of the present invention. FIG. 6A illustrates a plurality of MPEG2-TTS packets, each having a total size of 192 bytes and formed by adding a 4-byte timestamp to a 188-byte TS packet. FIG. 6B illustrates a PCP generated by the encryption processor 202. The PCP contains a plurality of MPEG2-TTS packets and serves as a single unit of encryption.

As illustrated in FIG. 6C, each PCP is set as a unit of data transmission, stored in a TCP packet, and transmitted. For example, of PCPs 271, 272, and 273 illustrated in FIG. 6D, if the PCP 272 is retained in the data accumulation unit 203 for a period of time exceeding the data discard reference period Td, the PCP 272 is discarded by the transmission data controller 205.

In this case, as illustrated in FIG. 6E, only the PCPs 271 and 273 are transmitted to the client. However, the PCPs 271 and 273 each contain a plurality of complete 192-byte TSS packets only, and do not contain any incomplete TSS packet. Therefore, the client can perform data reproduction on the basis of each of the complete TSS packets.

On the other hand, if data is discarded without setting the data size of a PCP to an integral multiple of that of a TTS packet, serious effects may occur in performing data reproduction on the client side. The reasons for this will be described with reference to FIGS. 7A through 7E. FIG. 7A illustrates a plurality of MPEG2-TTS packets, each having a total size of 192 bytes and formed by adding a 4-byte timestamp to a 188-byte TS packet. FIG. 7B illustrates a PCP with a data size that is not an integral multiple of the data size of a TTS packet.

As illustrated in FIG. 7C, each PCP is set as a unit of data transmission, stored in a TCP packet, and transmitted. For example, of PCPs 281, 282, and 283 illustrated in FIG. 7D, if the PCP 282 is retained in the data accumulation unit 203 for a period of time exceeding the data discard reference period Td and discarded, only the PCPs 281 and 283 are transmitted to the client as illustrated in FIG. 7E.

The PCPs 281 and 283 include incomplete TTS packets 291 and 292, respectively, each having a data size smaller than 192 bytes. The client cannot generate reproduced data based on these incomplete TTS packets 291 and 292. Since the client performs data reproduction on the basis of complete 192-byte TTS packets included in the PCPs 281 and 283, the incomplete PCP packets 291 and 292 are treated as useless data that cannot be used for reproduction.

As described with reference to FIGS. 6A through 6D, if the data size of a PCP is set to an integral multiple of the data size of a TTS packet and discard processing is executed on a PCP-by-PCP basis, the client can decrypt and reproduce TTS packets included in received data. Although TTS packets included in a discarded PCP cannot be reproduced, this will not significantly affect the quality of a picture to be reproduced if most PCPs have been transmitted successfully.

Thus, by measuring the retention period of each PCP in a buffer, discarding a PCP retained in the buffer for a period of time exceeding a predetermined allowable retention period, and thus removing the corresponding data from data to be transmitted to a client, the occurrence of a delay in data transmission can be prevented. When a client sends a data retransmission request to a server (network tuner) on the basis of TCP, the server executes retransmission based on TCP. If such retransmission or the like causes the retention period of a PCP in the buffer to exceed an allowable retention period, the PCP is discarded and only data retained in the buffer for a period of time within the allowable retention period is transmitted. Therefore, it is possible to maintain substantially real-time transmission of broadcast content.

Accordingly, the client can reproduce broadcast content in substantially real time. That is, even if a request for retransmission of a TCP packet is made, the resulting delay time can be eliminated and is not maintained or accumulated. Thus, the client can maintain real-time reproduction of broadcast content. Additionally, for example, if a channel change request is output from the client to the server, the server can respond to the request without delay, and can consistently provide quick responses to user requests.

The above-described embodiment refers to the cases in which a PCP is used as a unit of data discard processing. Instead of a PCP, for example, a Group of Pictures (GOP) in MPEG data may be used as a unit of discard processing. In this case, on a GOP-by-GOP basis, the data-retention-period monitoring unit 206 monitors the retention period of data in the data accumulation unit 203 and discards data retained for a period of time exceeding a predetermined allowable period. However, if transmission data is encrypted data, information corresponding to each GOP cannot be obtained without decrypting the data. This means that when transmission data is not data to be encrypted, processing is performed on the transmission data on a GOP-by-GOP basis. However, this does not apply to the case where MPEG-based GOP information is added to encrypted data in encryption processing.

In the embodiment described above, data to be discarded is determined on the basis only of the retention period of each PCP in the buffer. Alternatively, for example, data may be discarded when the amount of data retained in the data accumulation unit 203 exceeds a predetermined value. In this case, the transmission data controller 205 includes a monitoring unit which monitors the amount of data retained in the data accumulation unit 203. Then, when the monitoring unit detects that the amount of data retained in the data accumulation unit 203 is greater than or equal to a predetermined allowable value, the data discarding unit 207 discards data in order of storage in the data accumulation unit 203 on a specified unit basis (e.g., on a PCP-by-PCP basis). A reference value at which discarding starts is changed, for example, according to the bit rate of broadcast data.

Additionally, a client may send a data discarding request to a server (network tuner), which then receives the request and discards the corresponding data on a specified unit basis (e.g., on a PCP-by-PCP basis). The request sent by the client may not necessarily be a direct request that explicitly requests discarding of data. Instead, when the server receives some sort of request, such as a channel change request, from the client, the server may discard data on the basis of its condition (e.g., the retention period of data or the amount of retention of data described above). A direct discard request from the client may include information about the amount of data (e.g., the number of bytes or seconds of data) to be discarded so that the server can execute the data discard processing according to the received request.

3. Configuration for Providing Client with User Interface (UI)

Next, with reference to FIG. 8 and subsequent drawings, there will be described an exemplary configuration in which a server or the network tuner 200 of FIG. 1 provides the clients 251 and 252 with a user interface (UI).

FIG. 8 illustrates a configuration of an information processing apparatus or a network tuner 200 according to a second embodiment of the present invention. The network tuner 200 of FIG. 8 is formed by adding a UI generating unit 301 and a remote-control-signal receiving unit 302 to the network tuner 200 of the first embodiment described with reference to FIG. 2.

Typical display apparatuses (e.g., televisions) having network output terminals include a tuner unit for receiving broadcast waves, a display unit for outputting received content, and network output terminals. In such a display apparatus, data displayed on the display unit does not necessarily match that output to the network. Digital content needs to be output to the network according to DTCP-IP. For broadcast content, DTCP-IP data or PCPs described above is generated and the resulting TCP packet is output to a specific client that has been authenticated.

A typical display apparatus, such as a television, displays a UI as well as broadcast content on a display unit, which can be operated with a remote control or the like attached to the television. The displayed UI contains various types of information, such as operation information, guide information, message notification, bookmark information, and listening history information. However, such UI information is not provided to clients connected to the network.

By drawing a UI on an output picture on the client side, it is possible to show both an operation performed via a network and an operation performed with a physical remote control. However, this configuration has some disadvantages as follows:

1. Creating a program for a UI is burdensome to a network client.
2. The Broadcast Markup Language (BML) broadcast on the network client needs to be interpreted, which involves considerable development man-hours (BML refers to an XML-based page description language for creating a UI which can include operation buttons and link information).
3. The network client needs to perform updating in synchronization with updating of a UI on the server side.
4. If UIs are drawn on both the server and client sides, it is difficult to achieve synchronization therebetween when physical and virtual remote controls are used simultaneously.
5. When a UI operation unit is present only on the server side, a modification can be made by sending an update via broadcast waves. However, if both the server and client have UIs, the client cannot receive a software update via broadcast waves, as there is no tuner on the client side.

Thus, various problems may occur if a unique UI is created and used on the client side. The network tuner 200 of FIG. 8 has a configuration that can solve such problems. The network tuner 200 provides a network-connected client with not only received broadcast content, but also UI information generated by the UI generating unit 301 and stored in a TCP packet generated according to DTCP-IP. Then, the network tuner 200 causes the client to process the received TCP packet in a manner similar to processing performed on the broadcast content. Thus, a UI corresponding to the received UI information can be displayed on a display unit on the client side.

The UI displayed on the display unit on the client side is the UI generated on the server side. Therefore, if functions of the UI are updated on the server side, the updated UI is provided to the client side and becomes available. Since a UI drawing operation is centralized at the UI generating unit 301 illustrated in FIG. 8, processing corresponding to a physical remote control and that corresponding to a virtual remote control can be performed in a uniform manner.

Figure 9:
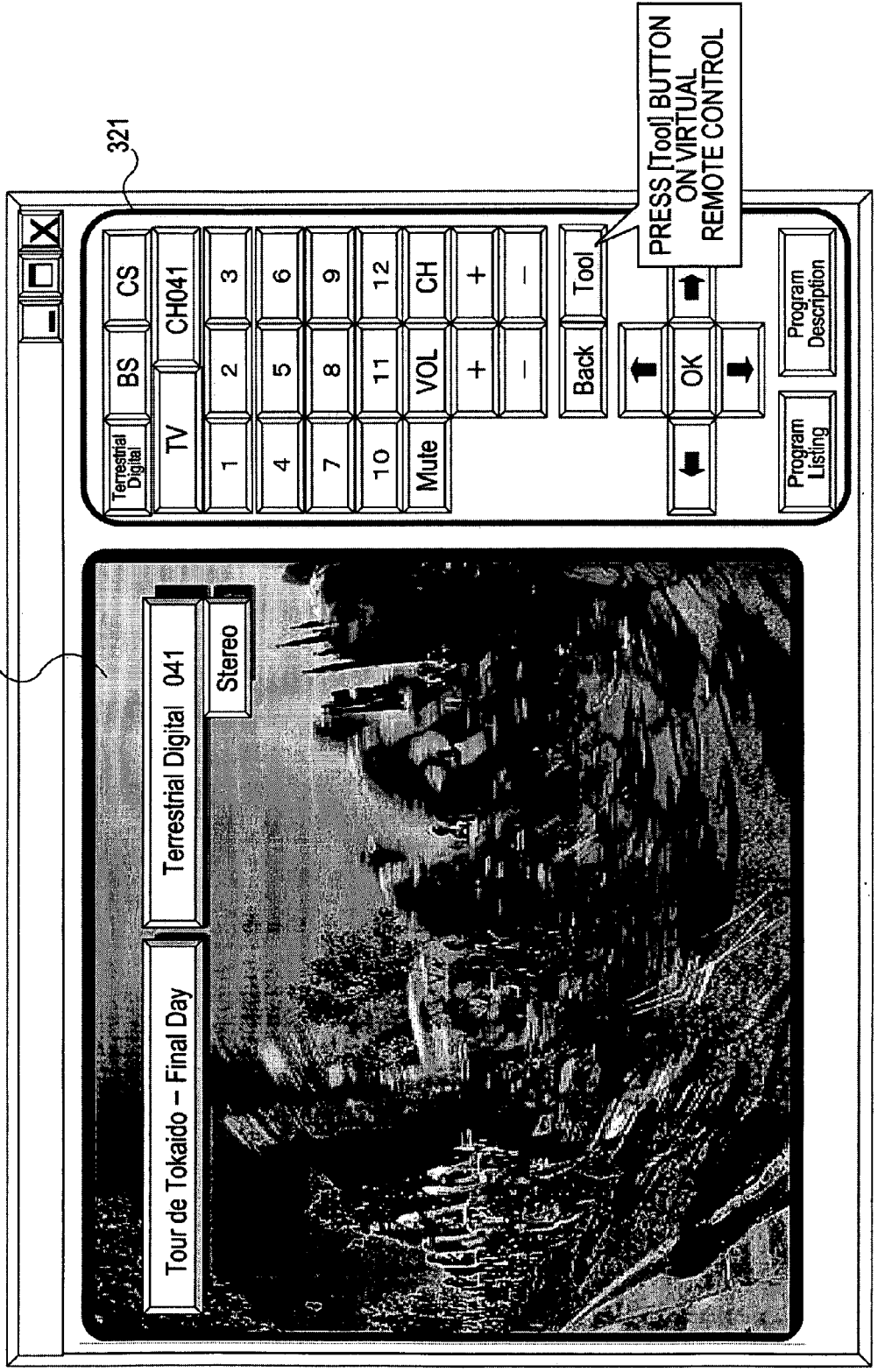
FIG. 9 illustrates exemplary display information output to a display unit on a client side.

A physical remote control is a real remote control that is used to input a remote control signal to the remote-control-signal receiving unit 302 of FIG. 8. A virtual remote control is a remote control displayed on a display unit of a client (e.g., client 251 of FIG. 1) connected via a network to the server (network tuner 200). FIG. 9 illustrates an example of display information output to a display unit on the client side. The display information of FIG. 9 contains a virtual remote control 321 and broadcast content display data 322 received from the server (network tuner 200). The virtual remote control 321 is displayed on the display unit by a program on the client side.

Processing performed by the network tuner 200 of the present embodiment will now be described with reference to FIG. 8. As illustrated in FIG. 8, the network tuner 200 includes the UI generating unit 301 and the remote-control-signal receiving unit 302, as well as the broadcast-wave receiving unit 201, encryption processor 202, data accumulation unit (buffer) 203, data transmission unit 204, and transmission data controller 205.

The broadcast-wave receiving unit 201, encryption processor 202, data accumulation unit 203, data transmission unit 204, and transmission data controller 205 have configurations similar to those described with reference to FIG. 2 through FIG. 7D, and perform processing similar to that described above. The UI generating unit 301 generates and outputs display information and UI information corresponding to a request from the physical remote control (not shown) or virtual remote control displayed on the display unit of the network-connected client.

The display information generated by the UI generating unit 301 is provided to the client in a process similar to that for broadcast content. That is, after DTCP-IP-compliant PCPs are generated by encryption performed by the encryption processor 202 and stored in the data accumulation unit 203, the data transmission unit 204 generates a TCP packet and an IP packet, which are then provided to the client. The client executes processing similar to that for broadcast content and displays the display information generated by the UI generating unit 301 on the display unit on the client side.

The UI generating unit 301 generates display information (user interface) to be provided to the client, according to a display information generating program stored in a storage unit (not shown) of the network tuner 200 and by using display content stored in the storage unit. Alternatively, the UI generating unit 301 may generate the display information by using information, such as an electronic program guide (EPG) or notification information from a broadcast station, received by the broadcast-wave receiving unit 201.

For example, when a Tool button (see FIG. 9) included in the virtual remote control 321 displayed on the display unit on the client side is pressed, the corresponding operation information is input via the network to the UI generating unit 301 in the network tuner 200. If this operation information is a UI request, the UI generating unit 301 generates and outputs display information (user interface) to the client in response to the receipt of this UI request.

Figure 10:
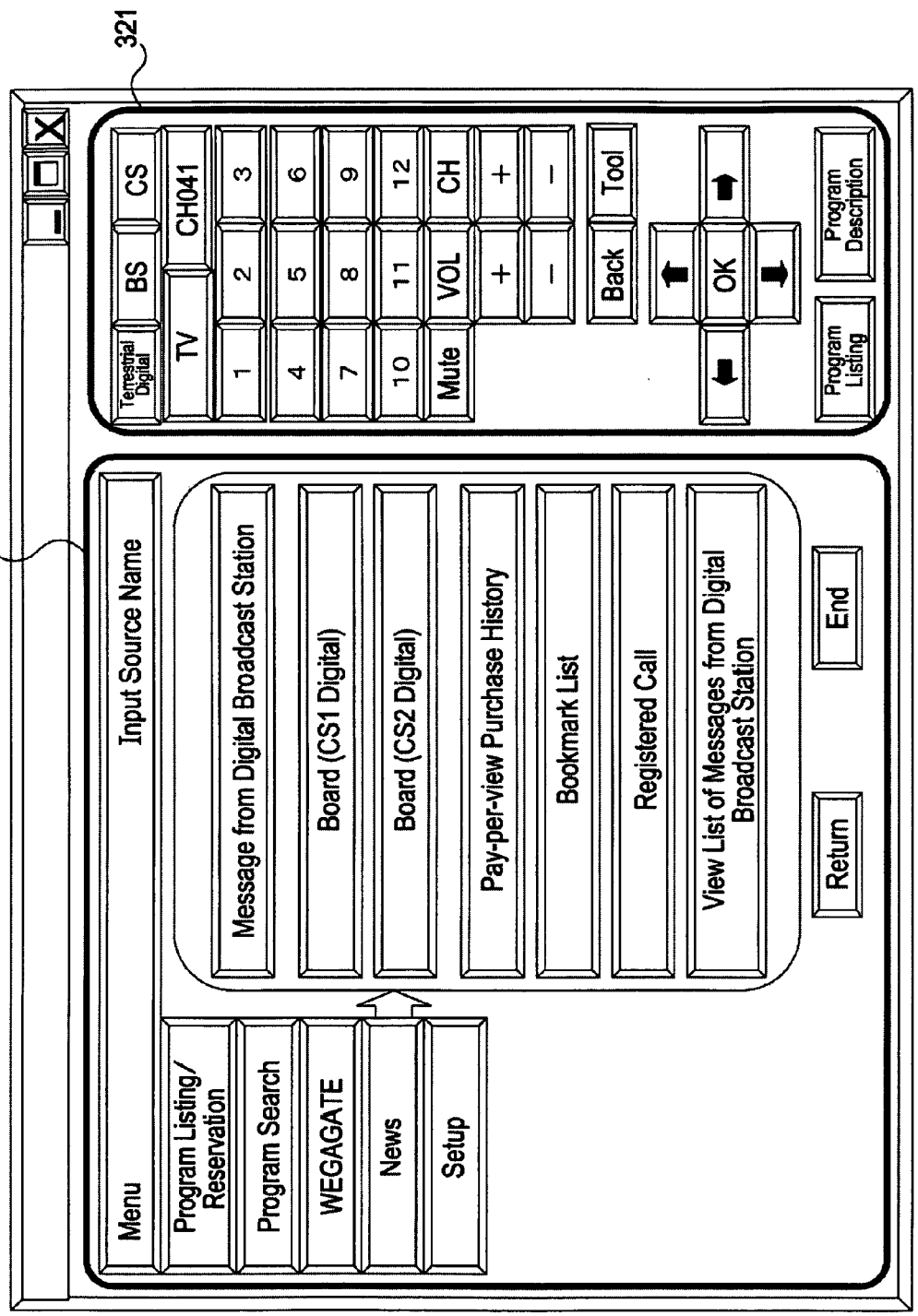
FIG. 10 illustrates exemplary UI information output to the display unit on the client side.

This processing causes, for example, UI information 323 of FIG. 10 to be displayed on the display unit of the client. The client executes packet processing (i.e., decryption and reproduction processing) similar to that for broadcast content and thus displays the UI information 323.

A UI generation request to the UI generating unit 301 may be made with the virtual remote control on the client side, physical remote control, or operation unit attached to the network tuner 200. A request from the client is not limited to that made through processing performed with the virtual remote control. For example, the UI generating unit 301 may input a client message based on the Simple Object Access Protocol (SOAP) defined as a protocol for message communication between network devices by the Universal Plug and Play (UPnP) defining home network specifications. Then, on the basis of this input, the UI generating unit 301 generates a UI and provides the client with the generated UI. Alternatively, the UI generating unit 301 may receive a request via a Web page presented to the client and respond to the received request.

The configuration of the present embodiment can provide the following effects:

1. Since a UI needs to be implemented only on the server (network tuner) side instead of both the server and client sides, the number of implementation man-hours can be reduced.

2. Since a UI is drawn only on the server side, it is easy to achieve synchronization between the physical and virtual remote controls.

3. Since a UI is drawn only on the server side, it is easy to achieve synchronization when there are a plurality of virtual remote controls.

4. Redesign of a UI involves updating on the server side only.

5. Correction of a problem in UI involves updating on the server side only.

4. Configuration for Providing Client with Program Information

Figure 11:
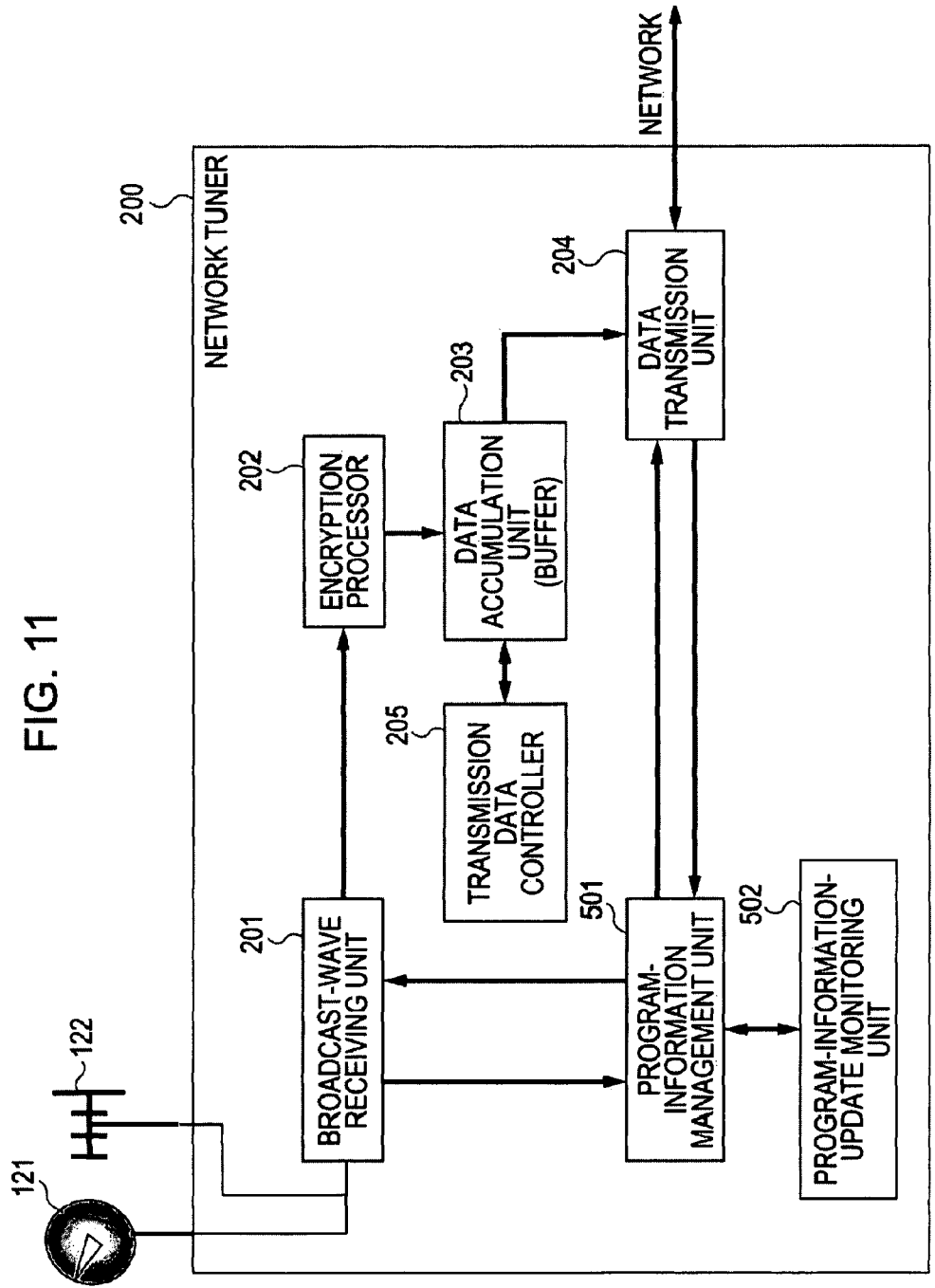
FIG. 11 illustrates an exemplary configuration of the network tuner which executes processing for providing program information to a client.

Next, an information processing apparatus according to a third embodiment of the present invention will be described. A configuration of and processing performed by an information processing apparatus or a network tuner 200 according to the third embodiment will be described with reference to FIG. 11. The network tuner 200 of FIG. 11 is formed by adding a program-information management unit 501 and a program-information-update monitoring unit 502 to the network tuner 200 of the first embodiment described with reference to FIG. 2.

The broadcast-wave receiving unit 201, encryption processor 202, data accumulation unit 203, data transmission unit 204, and transmission data controller 205 are illustrated in a simplified manner in FIG. 11, but have configurations similar to those described with reference to FIG. 2 through FIG. 7D, and perform processing similar to that described above. Hereinafter, processing performed by the program-information management unit 501 and program-information-update monitoring unit 502 will be described in detail.

The network tuner 200 serving as a server which provides clients with content receives not only broadcast content, but also program information corresponding to the broadcast content via the broadcast-wave receiving unit 201. This program information is managed by the program-information management unit 501. The program-information management unit 501 uses a content management directory having a hierarchical structure to manage such program information. The program-information management unit 501 manages program information by applying the Content Directory Service (CDS) defined in the UPnP, which provides home network specifications, and using a directory having a hierarchical structure.

Figure 12:
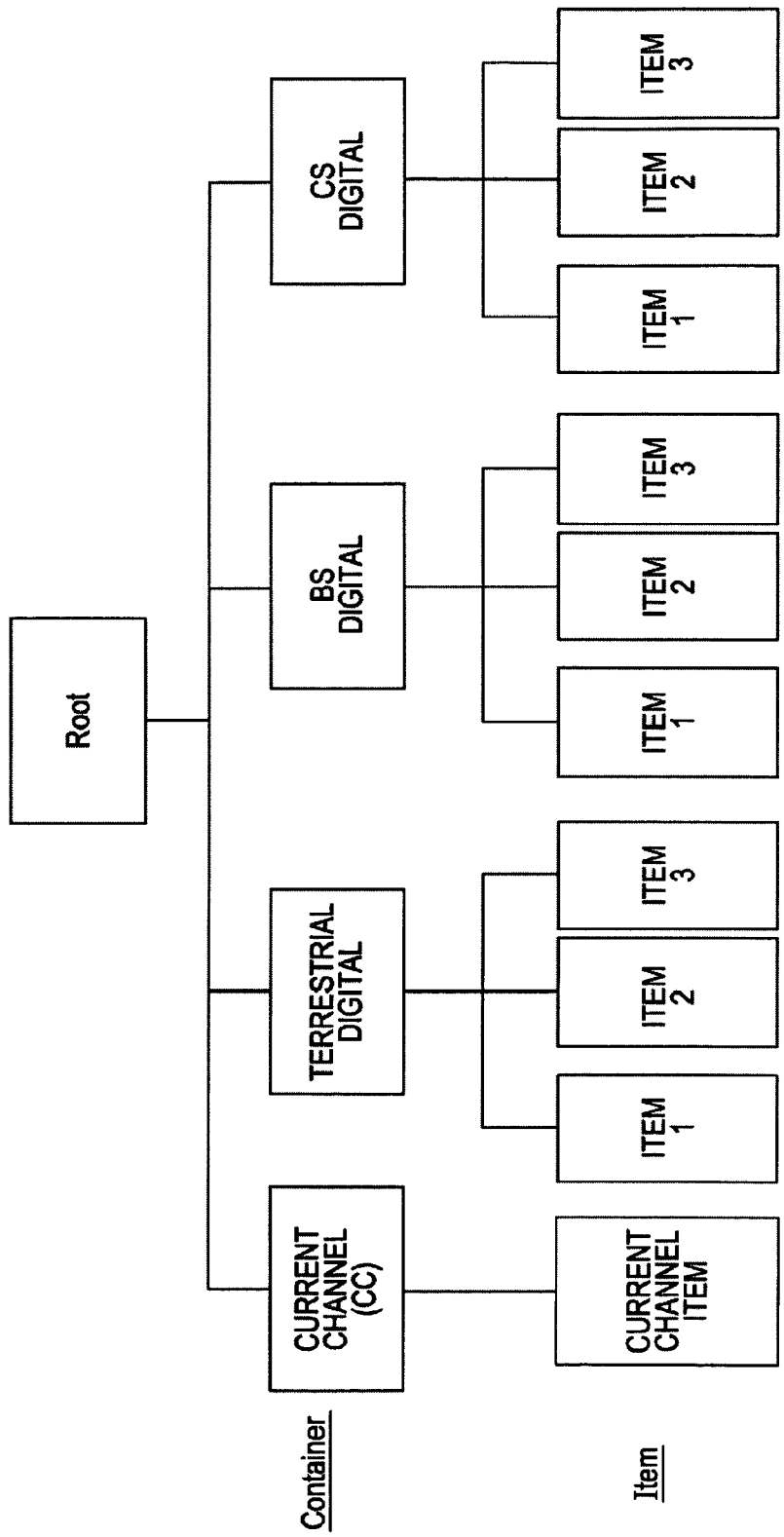
FIG. 12 illustrates an exemplary structure of data management to which the Content Directory Service (CDS) is applied.

FIG. 12 illustrates an exemplary structure of data management to which the CDS is applied. As illustrated in FIG. 12, the hierarchical structure can be expressed as a branched tree. This hierarchical structure represents a logical management structure corresponding to program information stored in an accessible storage unit of the program-information management unit 501.

As illustrated in FIG. 12, under the top node "Root", lower-level nodes "current channel (CC)", "terrestrial digital", "BS digital", and "CS digital" are placed. Then, under these lower-level nodes, program information data for each program corresponding to each channel is placed. Each program information data is called "item". An upper-level object defined as a group of items is called "Container". "Current channel item" is program information corresponding to a channel currently selected by the network tuner 200.

For example, when a user viewing a program on the client side (e.g., client 251 of FIG. 1) which receives broadcast content via a network from the network tuner 200 changes the channel, the current channel item in the CDS is changed. In response to this change, a notification that a Container containing the current channel item has been changed is sent to the user. This processing is performed according to the General Event Notification Architecture (GENA) defined in the UPnP, and such notification information is called "GENA Notify". GENA is architecture for server-client message communication. Regardless of whether a request from the client has been received, GENA makes it possible to automatically send GENA Notify to notify the client that information has been updated on the server side.

As described above, when a program being viewed on the client side is changed, the network tuner 200 executes processing for sending GENA Notify to notify the client that a Container containing the current channel item has been changed. Therefore, if the user changes the channel frequently, GENA Notify is frequently sent from the server to the client.

For a client not interested in the updated program information, such notification information frequently sent from the server is not only unnecessary, but may place a load on the server and client and cause unnecessary communication over the network.

The information processing apparatus or network tuner 200 of the third embodiment illustrated in FIG. 11 is configured not to perform such unnecessary notification, and is configured to perform notification only when it is determined that the client needs the information.

Figure 13:
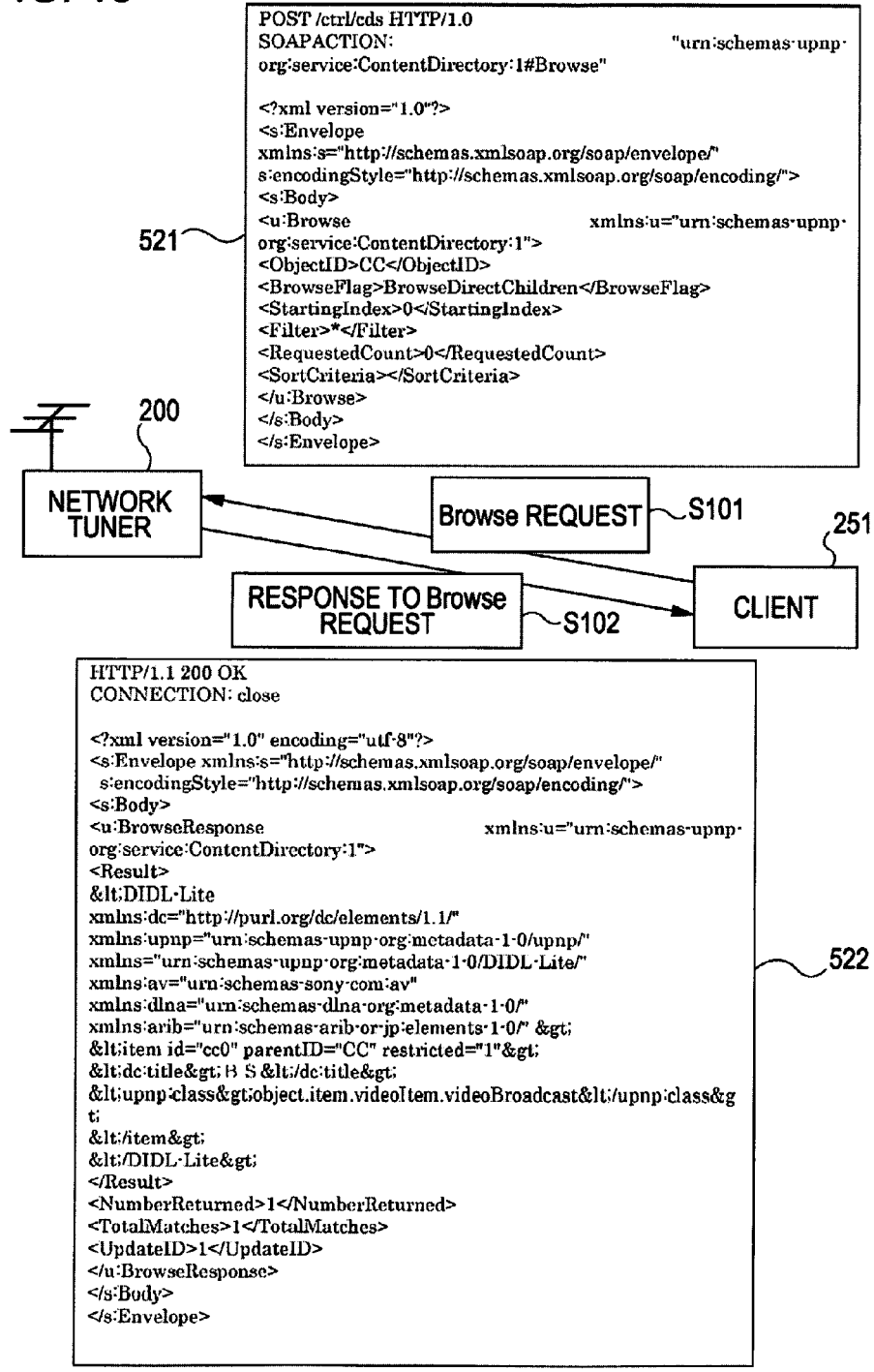
FIG. 13 illustrates processing carried out when a client performs Browse of program information.

FIG. 13 illustrates processing performed when the client performs a Browse of program information. For example, there will be described processing performed when the client obtains program information corresponding to the current channel item. In step S101, the client 251 sends a program information request (BrowseDirectChildren request) 521 to the network tuner 200.

Upon receipt of the program information request 521, the network tuner 200 sends, in step S102, program information 522 corresponding to the Container containing the current channel item to the client 251. Thus, the client 251 can output the program information 522 to its display unit and Browse the displayed program information 522. For example, the program information request 521 and the program information 522 are XML-based. The client generates display data on the basis of the XML-based program information 522 and outputs the generated display data to the display unit. Thus, program information is provided on the basis of a Browse request from the client.

Figure 14:
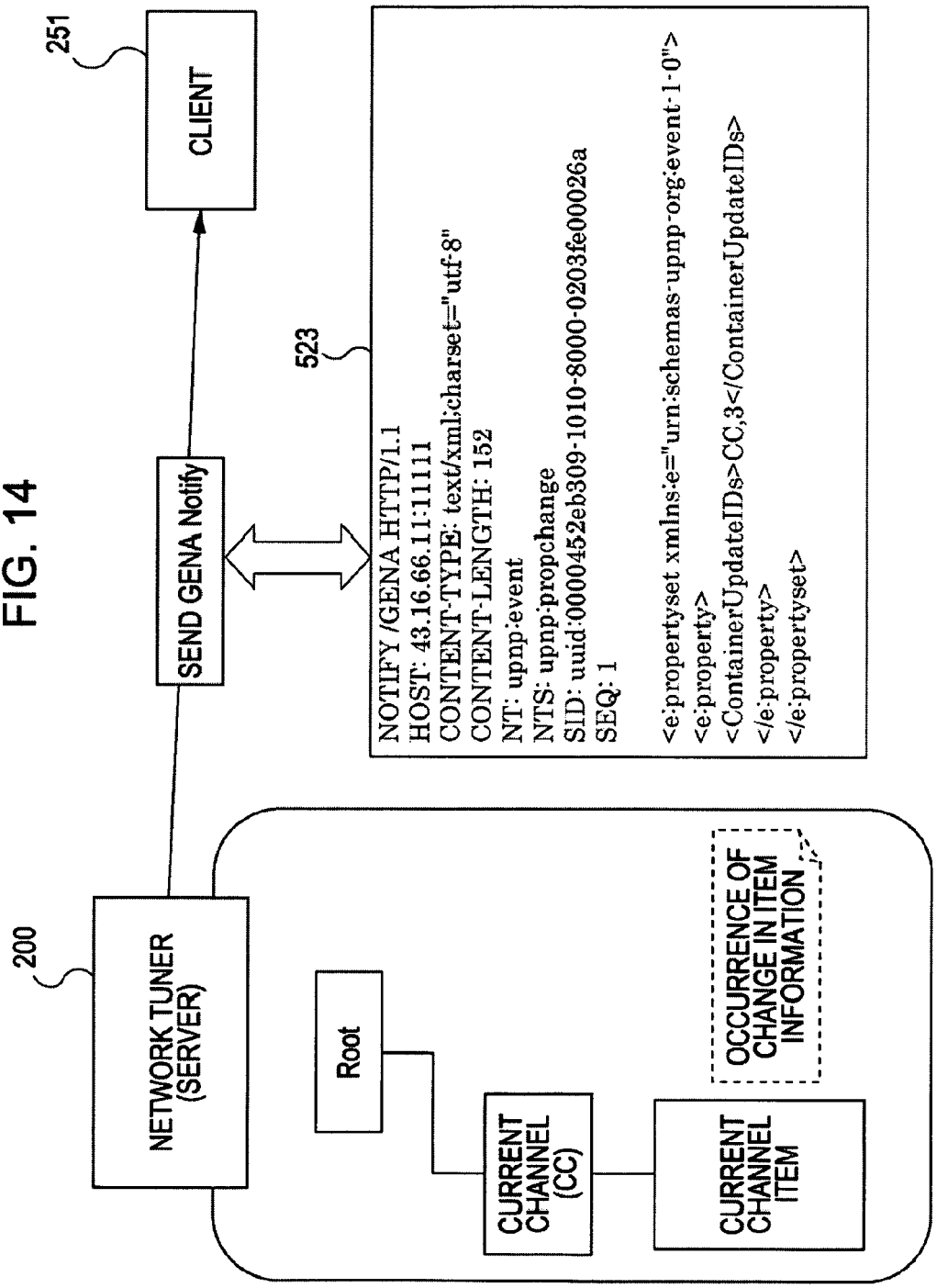
FIG. 14 illustrates GENA Notify processing performed when a user on a client side has changed a selected channel.

For example, as described above, when a user on the client side changes the selected channel, the network tuner 200 updates the current channel item (see FIG. 12) as shown in FIG. 14. Upon occurrence of this update, the network tuner 200 sends GENA Notify to notify the client 251 that information has been changed or updated. For example, GENA Notify 523 shown in FIG. 14 is sent to the client 251.

The network tuner 200 of the present embodiment has a flag corresponding to each Container in the hierarchical management structure based on CDS described with reference to FIG. 12. The flag indicates whether a client has performed a Browse. That is, for each Container, the program-information management unit 501 in the network tuner 200 of FIG. 11 has a flag indicating whether a client has performed a Browse of the Container. This flag is called "Notify flag". For example, the program-information management unit 501 has a flag management table shown in FIG. 15 and updates the flag according to changes described below.

The network tuner 200 updates the Notify flag as described below:

(a) A flag for each Container is initially set to "0".

(b) When a Browse request for browsing a Container is received from a client, a flag corresponding to the Container is set to "1".

(c1) When information (e.g., item) corresponding to a Container with a flag value of "1" is changed, the network tuner 200 sends GENA Notify and sets the flag for the Container to "0".

(c2) Even when information (e.g., item) corresponding to a Container with a flag value of "0" is changed, the network tuner 200 does not send GENA Notify.

As an example of processing performed for obtaining program information corresponding to the current channel item, the foregoing description made with reference to FIG. 13 through FIG. 15 refers to the processing which is performed on the basis of the program information request 521 from the client 251 illustrated in FIG. 13. Alternatively, the network tuner 200 may be configured such that a Browse request (BrowseMetadata) for browsing metadata corresponding to a Container or metadata corresponding to an item at a lower level of a Container is processed and then, the corresponding flag is set as described above.

Specific examples of such processing will be described with reference to FIGS. 16A1, 16A2, 17B1, and 17B2.

First, processing performed when a Notify flag is "1" will be described with reference to FIG. 16A1 and FIG. 16A2.

FIG. 16A1 illustrates processing in which a Notify flag is set to "1". In step S201, the network tuner 200 receives from any client (e.g., client 251) a Browse request (BrowseDirectChildren request) for browsing a Container corresponding to the current channel. Upon receipt, in step S202, the network tuner 200 returns to the client 251 the program information 522 described with reference to FIG. 13. Then, in step S203, a Notify flag for the Container corresponding to the current channel is set to "1". This series of processing is performed by the program-information management unit 501 in the network tuner 200 of FIG. 11.

FIG. 16A2 illustrates program information update notification performed when a Notify flag is "1". In other words, FIG. 16A2 illustrates processing in which GENA Notify is sent to notify that program information has been updated. The program-information-update monitoring unit 502 in the network tuner 200 monitors the updating of information for each Container in the hierarchical management structure based on CDS described with reference to FIG. 12. In step S211, when the program-information-update monitoring unit 502 detects that information corresponding to the current channel has been changed, a notification of the occurrence of this change is sent from the program-information-update monitoring unit 502 to the program-information management unit 501.

Upon receipt of this notification about the change in information, the program-information management unit 501 checks, in step S212, the Notify flag corresponding to the Container where the change has occurred. Here, the program-information management unit 501 checks the Notify flag for the Container corresponding to the current channel.

This example refers to the case where Notify flag="1", which means that a Browse request for browsing of the Container corresponding to the current channel has been received from any client. That is, Notify flag="1" indicates that the Notify flag is set to "1" by the processing performed in steps S201 though S203 of FIG. 16A1.

After confirming in step S212 that the Notify flag for the Container corresponding to the current channel is "1", the program-information management unit 501 sends, in step S213, GENA Notify as an information update notification to the client 251. Such GENA Notify is sent to all clients that have accepted to receive GENA Notify when information is updated. In other words, GENA Notify is sent to all clients that have gone through a GENA Subscribe process. That is, when a Browse request from a single client is received and a Notify flag is set to "1", GENA Notify is sent to all clients connected to the network tuner 200 and have gone through a GENA Subscribe process.

Upon completion of transmission of the GENA Notify in step S213, the program-information management unit 501 resets the Notify flag to "0" in step S214.

Next, processing performed when a Notify flag is "0" will be described with reference to FIG. 17B1 and FIG. 17B2. FIG. 17B1 illustrates a state in which a Notify flag for the Container corresponding to the current channel is "0".

FIG. 17B2 illustrates processing in which, when the Notify flag is "0", notification of program information update or transmission of GENA Notify is cancelled. The program-information-update monitoring unit 502 in the network tuner 200 monitors the updating of information for each Container in the hierarchical management structure based on CDS described with reference to FIG. 12. In step S311, when the program-information-update monitoring unit 502 detects that information corresponding to the current channel has been changed, a notification about the occurrence of this change is sent from the program-information-update monitoring unit 502 to the program-information management unit 501.

Upon receipt of this notification about the change in information, the program-information management unit 501 checks, in step S312, the Notify flag corresponding to the Container where the change has occurred. Here, the program-information management unit 501 checks the Notify flag for the Container corresponding to the current channel.

This example refers to the case where Notify flag="0", which means that no Browse request for browsing of the Container corresponding to the current channel has been received from any client. For example, Notify flag="0" indicates that no Browse request has been received from any client after the transmission of GENA Notify described with reference to FIG. 16A2.

After confirming in step S312 that the Notify flag for the Container corresponding to the current channel is "0", the program-information management unit 501 cancels, in step S313, the transmission of GENA Notify serving as an information update notification to the client 251.

As described above, with respect to each Container in the program information directory managed through the CDS, the network tuner 200 of the present embodiment sets a Notify flag indicating whether any client has sent a Browse request. Then, according to the set value of the Notify flag, the network tuner 200 determines whether to send a notification of update of program information.

If no client has sent a Browse request for browsing of the updated program information since information corresponding to the Container was changed, the network tuner 200 does not send the subsequent GENA Notify serving as a notification of update of the program information. This processing makes it possible to prevent transmission of GENA Notify unnecessary for clients.

The above-described embodiments refer to cases in which a Notify flag indicating whether a Browse request has been made is set for each Container. Alternatively, for example, a Notify flag may be set for each client connected to the network, as well as for each Container. In this case, the network tuner 200 has a flag management table shown in FIG. 18 and updates each flag depending on whether there has been a Browse request from each client.

In the embodiments described above, when a client sends a Browse request for browsing of program information, GENA Notify serving as a notification of subsequent change in program information is sent to all clients that satisfy predetermined conditions, that is, to all clients that have gone through a GENA Subscribe process. This has a problem in that GENA Notify is sent to some clients that actually do not require such notification.

However, as shown in FIG. 18, if a Notify flag indicating whether a Browse request has been received therefrom is set for each client, a determination as to whether GENA Notify should be sent can be made with respect to each client. This allows application of control appropriate for each client.

Instead of setting a Notify flag for each Container, a single flag may be set for the CDS tree illustrated in FIG. 12. In other words, a Notify flag is not individually set for each Container. In this case, when a Browse request for browsing any of the Containers in the CDS tree occurs, the Notify flag is set to "1". Then, when any information contained in the CDS tree is changed and GENA Notify is sent to clients, the Notify flag is reset to "0".

As exceptional processing, GENA Notify may be sent to specific clients every time regardless of the value of the Notify flag. This is made possible when, in the flag management table of FIG. 18, the value of a flag for such a specific client is fixed at "1". For requesting such an exceptional setting, the client may add information indicating this exceptional setting to, for example, an HTTP header of a GENA Subscribe message when a GENA Subscribe process is performed for GENA-based setting. Then, the client outputs this GENA Subscribe message to the network tuner, which determines whether any exceptional request has been made and performs processing accordingly.

Alternatively, GENA Notify about specific Containers may be sent every time regardless of the value of the Notify flag. In this case, GENA Notify about a specific Container is sent to clients every time a change occurs in the Container, regardless of the value of the Notify flag. This is also made possible when, in the flag management table of FIG. 15 or FIG. 18, the value of a flag for the specific Container is fixed at "1". Such an exceptional Container may either be predetermined or selected by the client at the time of GENA Subscribe process. The setting may be varied depending on the client. This is made possible by varying, in the flag management table of FIG. 18, some flag values fixed at "1".

As described above, for each Container in the program information directory managed through the CDS and for each client, the network tuner of the present embodiment sets a Notify flag and sends a notification of update of program information according to the set value of the Notify flag. This can prevent transmission of unnecessary GENA Notify, which is an unnecessary notification of change in program information, and thus has the following effects:

(a) A network processing load on the client can be reduced.
(b) A network processing load on the server can also be reduced.
(c) Since unnecessary packets are not transmitted over the network, effective use of network bands can be achieved.

Although the present invention has been described in detail with reference to specific embodiments, it should be understood that modifications and substitutions of these embodiments may be made by those skilled in the art without departing from the scope of the invention. The present invention has been disclosed by providing specific embodiments, but should not be interpreted as being limited to these embodiments. The scope of the present invention should be determined with reference to the appended claims.

The series of processing described in the present specification can be executed by hardware, software, or a combination of both. To execute the processing by software, a program in which a processing sequence is recorded is installed onto a memory of a computer included in dedicated hardware, or onto a general-purpose computer capable of executing various kinds of processing.

For example, the program may be prestored in a hard disk or a read-only memory (ROM) serving as a recording medium. Alternatively, the program may be temporarily or permanently stored (recorded) on a removable recording medium, such as a flexible disk, a compact-disc read-only memory (CD-ROM), an MO disc, a digital versatile disc (DVD), a magnetic disk, and a semiconductor memory. Such a removable recording medium may be provided as so-called package software.

The program may be installed onto a computer from such a removable recording medium as described above. Alternatively, the program may be wirelessly transferred to a computer from a download site or may be transferred to a computer via a network, such as a local area network (LAN) or the Internet. The computer may receive and install the transferred program in a recording medium, such as an internal hard disk.

Various kinds of processing described in the present specification may be executed sequentially in the described order, or may be executed in parallel or individually as necessary or according to the capability of an apparatus executing the processing.

when detection information indicating that an update of program information has been detected is received from the program-information-update monitoring unit, if the flag is set to a value indicating that browse processing has been performed, the program-information management unit sends, to the client, an information update notification indicating that the program information has been updated.

What is claimed is:

1. An information processing apparatus for receiving broadcast data and outputting the received broadcast data to a client connected to a network, the information processing apparatus comprising:

a broadcast receiving unit that receives the broadcast data;
an encryption processor that performs encryption on the broadcast data received by the broadcast receiving unit to generate encrypted data, wherein the encrypted data comprises a protected content packet, wherein the protected content packet includes a plurality of timestamped transport stream packets formed by adding a timestamp to a transport stream packet, and wherein the protected content packet has a size that is an integral multiple of the size of one of the plurality of the timestamped transport stream packets;
a data accumulation unit that accumulates the encrypted data generated by the encryption processor;
a data retention period monitoring unit that associates an input time at which the protected content packet was input from the encryption processor to the data accumulation unit, records the input time associated with the protected content packet, and calculates a retention period for the protected content packet in the data accumulation unit;
a data transmission unit that generates a communication packet, wherein the communication packet stores the encrypted data accumulated in the data accumulation unit, and outputs the generated communication packet to a network; and a transmission data controller configured to monitor a retention period of the protected content packet accumulated in the data accumulation unit and remove, from transmission data, a protected content packet retained in the data accumulation unit for a period of time exceeding a predetermined allowable retention period.

2. The information processing apparatus according to claim 1, wherein the data transmission unit is configured to generate, as transmission data, a transmission control protocol packet from one or more protected content packets accumulated in the data accumulation unit, the one or more protected content packet being retained in the data accumulation unit for a period of time less than or equal to a predetermined allowable retention period, and output the generated transmission control protocol packet to the network.

3. The information processing apparatus according to claim 1, wherein the transmission data controller is configured to monitor the amount of the encrypted data retained in the data accumulation unit and remove, if the amount of the encrypted data retained in the data accumulation unit exceeds a predetermined allowable value, at least part of the encrypted data accumulated in the data accumulation unit from transmission data.

4. The information processing apparatus according to claim 1, further comprising a user interface generating unit that generates user interface information to be provided to the client,
wherein the user interface generating unit is configured to generate user interface information in response to a request from the client and output the generated user interface information to the encryption processor; and
the data transmission unit is configured to generate a transmission control protocol packet including the user interface information and output the generated transmission control protocol packet to the client.

5. The information processing apparatus according to claim 4, wherein the user interface generating unit is configured to generate the user interface information on the basis of an input from a remote control or from an operation unit.

6. The information processing apparatus according to claim 1, further comprising:
a program-information management unit that inputs, via the broadcast receiving unit, program information corresponding to a broadcast program input via the broadcast receiving unit and manages the input program information; and
a program-information-update monitoring unit that monitors whether program information managed by the program-information management unit has been updated,
wherein the program-information management unit has a flag indicating whether a client connected to the network has performed browse processing on program information; and
when detection information indicating that an update of program information has been detected is received from the program-information-update monitoring unit, if the flag is set to a value indicating that browse processing has been performed, the program-information management unit sends, to the client, an information update notification indicating that the program information has been updated.

7. The information processing apparatus according to claim 6, wherein the program-information management unit is configured to have a flag for each Container serving as a higher-level object than an item corresponding to each program information, the flag indicating whether a client connected to the network has performed browse processing on program information, and control the information update notification with respect to each Container.

8. The information processing apparatus according to claim 6, wherein the program-information management unit is configured to have a flag for each client, the flag indicating whether a client connected to the network has performed browse processing on program information, and control the information update notification with respect to each client.

9. An information processing method executed in an information processing apparatus for receiving broadcast data and outputting the received broadcast data to a client connected to a network, the information processing method comprising the steps of:
receiving the broadcast data at a broadcast receiving unit;
performing, with an encryption processor, encryption on the broadcast data received by the broadcast receiving unit to generate encrypted data, wherein the encrypted data is a protected content packet, and wherein the protected content packet includes a plurality of timestamped transport stream packets formed by adding a timestamp to a transport stream packet, and wherein the protected content packet has a size that is an integral multiple of the size of one of the plurality of the timestamped transport stream packets;
accumulating, with a data accumulation unit, the encrypted data generated by the encryption processor;
associating an input time at which the protected content packet was input from the encryption processor to the data accumulation unit, recording the input time associated with the protected content packet, and calculating a retention period for the protected content packet in the data accumulation unit;
transmitting data with a data transmission unit that generates a communication packet, wherein the communication packet stores the encrypted data accumulated in the data accumulation unit, and outputting the generated communication packet to a network; and
monitoring, with a transmission data controller, a retained state of the protected content packet accumulated in the data accumulation unit and removing the protected content packet if a period of time exceeding a predetermined allowable retention period is exceeded.

10. The information processing method according to claim 9, wherein in the step of transmitting data, a transmission control protocol packet is generated, as transmission data, from one or more protected content packets accumulated in the data accumulation unit, the one or more protected content packet being retained in the data accumulation unit for a period of time less than or equal to a predetermined allowable retention period, and the generated transmission control protocol packet is output to the network.

11. The information processing method according to claim 9, wherein in the step of controlling transmission data, the amount of the encrypted data retained in the data accumulation unit is monitored and if the amount of the encrypted data retained in the data accumulation unit exceeds a predetermined allowable value, at least part of the encrypted data accumulated in the data accumulation unit is removed from transmission data.

12. The information processing method according to claim 9, further comprising the step of generating a user interface, wherein a user interface generating unit generates user interface information to be provided to the client;

in the step of generating the user interface, the user interface information is generated in response to a request from the client and the generated user interface information is output to the encryption processor; and in the step of transmitting data, a transmission control protocol packet including the user interface information is generated and output to the client.

13. The information processing method according to claim 12, wherein in the step of generating a user interface, the user interface information is generated on the basis of an input from a remote control or from an operation unit.

14. The information processing method according to claim 9, further comprising the steps of:

managing program information, wherein a program-information management unit inputs, via the broadcast receiving unit, program information corresponding to a broadcast program input via the broadcast receiving unit and manages the input program information;

monitoring a program information update, wherein a program-information-update monitoring unit monitors whether program information managed by the program-information management unit has been updated; and controlling an information update notification, wherein the program-information management unit sets a flag indicating whether a client connected to the network has performed browse processing on program information, and when detection information indicating that an update of program information has been detected is received from the program-information-update monitoring unit, if the flag is set to a value indicating that browse processing has been performed, an information update notification indicating that the program information has been updated is sent to the client.

15. The information processing method according to claim 14, wherein in the step of controlling an information update notification, a flag indicating whether a client connected to the network has performed browse processing on program information is set for each Container which serves as a higher-level object than an item corresponding to each program information, and the information update notification is controlled with respect to each Container.

16. The information processing method according to claim 14, wherein in the step of controlling an information update notification, a flag indicating whether a client connected to the network has performed browse processing on program information is set for each client, and the information update notification is controlled with respect to each client.

17. A non-transitory computer readable medium encoded with a computer program for causing information processing to be executed in an information processing apparatus that receives broadcast data and outputs the received broadcast data to a client connected to a network, the information processing comprising the steps of:

receiving the broadcast data at a broadcast receiving unit;

performing, with an encryption processor, encryption on the broadcast data received by the broadcast receiving unit to generate encrypted data, wherein the encrypted data is a protected content packet, wherein the protected content packet includes a plurality of timestamped transport stream packets, formed by adding a timestamp to a transport stream packet, and wherein the protected content packet has a size that is an integral multiple of the size of one of the plurality of the timestamped transport stream packets;

accumulating, with a data accumulation unit, the encrypted data generated by the encryption processor;

associating an input time at which the protected content packet was input from the encryption processor to the data accumulation unit, recording the input time associated with the protected content patent, and calculating a retention period for the protected content packet in the data accumulation unit;

transmitting data with a data transmission unit that generates a communication packet, wherein the communication packet stores the encrypted data accumulated in the data accumulation unit, and outputting the generated communication packet to a network; and monitoring, with a transmission data controller, a retained state of the protected content packet accumulated in the data accumulation unit and removing the protected content packet if a period of time exceeding a predetermined allowable retention period is exceeded.

* * * * *